(12) United States Patent
Scott

(10) Patent No.: US 6,965,961 B1
(45) Date of Patent: Nov. 15, 2005

(54) QUEUE-BASED SPIN LOCK WITH TIMEOUT

(75) Inventor: Michael L. Scott, Rochester, NY (US)

(73) Assignee: University of Rochester, Rochester, NY (US)

(*) Notice: Subject to any disclaimer, the term of this patent is extended or adjusted under 35 U.S.C. 154(b) by 413 days.

(21) Appl. No.: 10/377,024

(22) Filed: Mar. 3, 2003

Related U.S. Application Data

(60) Provisional application No. 60/361,063, filed on Mar. 1, 2002.

(51) Int. Cl.[7] ............................................. G06F 12/00
(52) U.S. Cl. ..................... 710/310; 710/39; 710/40; 710/45; 710/54; 710/200; 710/263; 718/102; 718/108
(58) Field of Search .............................. 710/39, 40, 45, 710/54, 200, 263; 718/102, 108

(56) References Cited

U.S. PATENT DOCUMENTS

| | | | | |
|---|---|---|---|---|
| 6,128,672 A | * | 10/2000 | Lindsley ....................... | 710/19 |
| 6,243,778 B1 | * | 6/2001 | Fung et al. ................... | 710/113 |
| 6,480,918 B1 | * | 11/2002 | McKenney et al. ......... | 710/200 |
| 6,668,291 B1 | * | 12/2003 | Forin et al. .................. | 710/54 |

* cited by examiner

Primary Examiner—Donald Sparks
Assistant Examiner—Ngoc Dinh
(74) Attorney, Agent, or Firm—Blank Rome LLP

(57) ABSTRACT

A queue-based spin lock with timeout allows a thread to obtain contention-free mutual exclusion in fair, FIFO order, or to abandon its attempt and time out. A thread may handshake with other threads to reclaim its queue node immediately (in the absence of preemption), or mark its queue node to allow reclamation by a successor thread.

33 Claims, 12 Drawing Sheets

B MARKS ITS OWN NODE AND LEAVES

C DEREFERENCES B's NODE AND RECLAIMS IT

B MARKS ITS NODE

B UPDATES TAIL POINTER, RECLAIMS ITS NODE, AND LEAVES

QUEUE-BASED SPIN LOCK WITH TIMEOUT

REFERENCE TO RELATED APPLICATION

The present application claims the benefit of U.S. Provisional Application No. 60/361,063, filed Mar. 1, 2002, whose disclosure is hereby incorporated by reference in its entirety into the present disclosure.

STATEMENT OF GOVERNMENT INTEREST

The work leading to the present invention was supported in part by NSF grants EIA-0080124, CCR-9988361 and CCR-0204344 and by DARPA/AFRL contract number F29601-00-K-0182. The government has certain rights in the invention.

FIELD OF THE INVENTION

The present invention is directed to a spin lock for use on shared-memory multi-processor computing devices and more particularly to a queue-based spin lock with timeout.

DESCRIPTION OF RELATED ART

Large-scale databases and Internet transaction applications now demand parallel servers capable of running on machines with twenty to a hundred processors or more. On such machines, spin locks are widely used for mutual exclusion. Traditional test_and_set-based spin locks, however, are vulnerable to memory and interconnection contention and do not scale well to large machines.

Queue-based spin locks avoid contention by arranging for every waiting thread to spin on a separate, local flag in memory. The MCS lock of Mellor-Crummey and Scott ("Algorithms for Scalable Synchronization on Shared-Memory Multiprocessors", *ACM Transactions on Computer Systems*, Vol. 9, No. 1, April 1991, pp. 21–65) uses a queue linked from head to tail. It requires only O(L+T) space for L locks and T threads. Each thread spins on a node that it allocated itself, and that may therefore reside in local memory even on a non-cache-coherent machine. The CLH lock, developed independently by Craig ("Building FIFO and priority-queueing spin locks from atomic swap," Technical Report TR 93-02-02, Department of Computer Science, University of Washington, February, 1993) and by Landin and Hagersten ("Queue Locks on Cache Coherent Multiprocessors", 8th *Intl. Parallel Processing Symposium*, Cancun, Mexico, April 1994, pp. 165–171) uses a queue linked from tail to head. It also requires only O(L+T) space, but each thread spins on the node allocated by its predecessor, which will be local only on a cache-coherent machine.

Over the past ten years, queue-based spin locks—the MCS lock in particular—have been incorporated into a variety of academic and commercial operating systems, including Compaq's Tru64, IBM's K42 and multiprocessor Linux systems, the Alewife and Hurricane Systems, and parallel real-time software from Mercury Computer Systems.

Outside the operating system, non-scalable test-and-set locks have come to be widely used in commercially important applications, notably database systems such as Oracle's Parallel Server and IBM's DB2. Many of these applications depend critically on the ability of a thread that waits too long to time out and abandon its attempt to acquire a lock. Timeout-capable locks ("try locks") allow a real-time application to signal an error condition or pursue an alternative code path. In a database system, they provide a simple means of recovering from transaction deadlock or preemption in critical sections.

Unfortunately it is difficult to combine scalability and timeout. The problem is that while threads competing for a test-and-set lock are mutually anonymous, and can abandon their spins without anyone being the wiser, threads in a queue-based lock are linked into an explicit data structure. A timed-out thread must somehow introduce its neighbors in the queue to one another, even in cases where the neighbors may also be timing out. Craig proposed ("Building FIFO and Priority-Queueing Spin Locks from Atomic Swap", Technical Report 93-02-02, University of Washington Computer Science Dept., February 1993) that a timed-out thread in a CLH lock mark its node as "abandoned". When releasing a lock a thread would skip over (and reclaim) abandoned nodes. This approach can easily require non-linear space and non-constant time. Mercury Computer Systems' version of the MCS lock incorporates a timeout mechanism, but abandons fairness: threads that are willing to wait indefinitely bypass threads with bounded wait times.

The problem of preemption in critical sections has received considerable attention over the years. Alternative strategies include avoidance, recovery, and tolerance. The latter approach is appealing for commercial applications because it does not require modification of the kernel interface: if a thread Waits too long for a lock, it assumes that the lock holder has been preempted. It abandons its attempt, yields the processor to another thread (assuming there are plenty) and tries again at a later time. In database systems timeout serves the dual purpose of deadlock recovery and preemption tolerance.

SUMMARY OF THE INVENTION

It is the object of the present invention to overcome the above-noted problems of the prior art. Specifically, the invention aims to
  (1) provide good performance, both
    (a) in the absence of contention, and
    (b) when many threads attempt to acquire the lock concurrently;
  (2) maintain fairness, granting lock requests in FIFO (first in, first out) order;
  (3) allow a thread to time out, reclaiming the thread's space in the queue before the thread would have reached the head of the queue if it had not timed out.

Unfortunately, it does not appear to be possible to guarantee that space will be reclaimed in bounded time in multiprogrammed systems. The present disclosure therefore encompasses two variants of the invention.

In the first variant, a timed-out thread "handshakes" with its neighbors to reclaim its space before leaving the queue. Space needs are therefore linear (O(L+T)), but timeout may be indefinitely delayed on a multiprogrammed system, because a neighbor thread may be preempted, and thus unable to cooperate. In the second variant, timeout is non-blocking: a thread is guaranteed to leave the queue in a bounded number of its own time steps, whether neighbors are preempted or not. Space, however, may not be reclaimed until some successor is active. In theory unbounded space may be required, but experiments confirm that linear space can be expected in practice.

Two preferred embodiments of each lock variant will be disclosed, one based on the CLH lock and the other on the MCS lock. The variants with guaranteed linear space but blocking timeout are herein named the CLH try lock and the MCS try lock. The variants with non-blocking timeout are herein named the CLH-NB try lock and the MCS-NB try lock. In each pair the CLH embodiment is the simpler of the two, but relies on cache coherence. The MCS embodiments can be expected to scale better on non-cache-coherent machines.

In the original CLH and MCS locks, and in the CLH try and MCS try locks, space management for queue nodes is delegated to the callers of the acquire and release operations, and the queue node passed to MCS_release or returned from CLH_release is guaranteed to be available for immediate reuse once the release operation completes. No such guarantee seems possible for locks with non-blocking timeout. We therefore choose in the CLH-NB try and MCS-NB try locks to perform dynamic space allocation within the acquire and release operations. To allow the release operation to find the queue node allocated by the acquire operation, we arrange for acquire to write a reference to that node into an extra field (a head pointer) of the lock variable itself, once the lock is held. A serendipitous side effect of this strategy is that the CLH-NB try and MCS-NB try locks can employ a standard application programming interface (API), making them suitable for linking with binary-only commercial applications.

BRIEF DESCRIPTION OF THE DRAWINGS

Two preferred embodiments of the invention (one based on the CLH lock, the other based on the MCS lock), each with two variants (one with guaranteed linear space but blocking timeout, the other with non-blocking timeout but theoretically unbounded space) will be set forth in detail with reference to the drawings, in which.

DETAILED DESCRIPTION OF THE PREFERRED EMBODIMENTS

Two preferred embodiments of the invention will now be set forth in detail with reference to the drawings. Two variants of each embodiment are described: one with guaranteed linear space but blocking timeout, the other with non-blocking timeout but theoretically unbounded space.

The first preferred embodiment (variant with blocking timeout) is called the CLH try lock. It is based on the earlier CLH lock of Craig ("Building FIFO and priority-queueing spin locks from atomic swap," Technical Report TR 93-02-02, Department of Computer Science, University of Washington, February, 1993) and of Landin and Hagersten ("Queue locks on cache coherent microprocessors," 8th Intl. Parallel Processing Symposium, Cancun, Mexico, April, 1994, pp. 165–171).

In the standard CLH lock, a thread leaves its queue node behind when releasing the lock. In its place, it takes the node abandoned by its predecessor. For a try lock, one would like to arrange for a thread that times out to leave with its own queue node. Otherwise, one might need O(P×L) queue nodes in the system as a whole, where P is the number of threads and L is the number of locks.

Figure 1A:
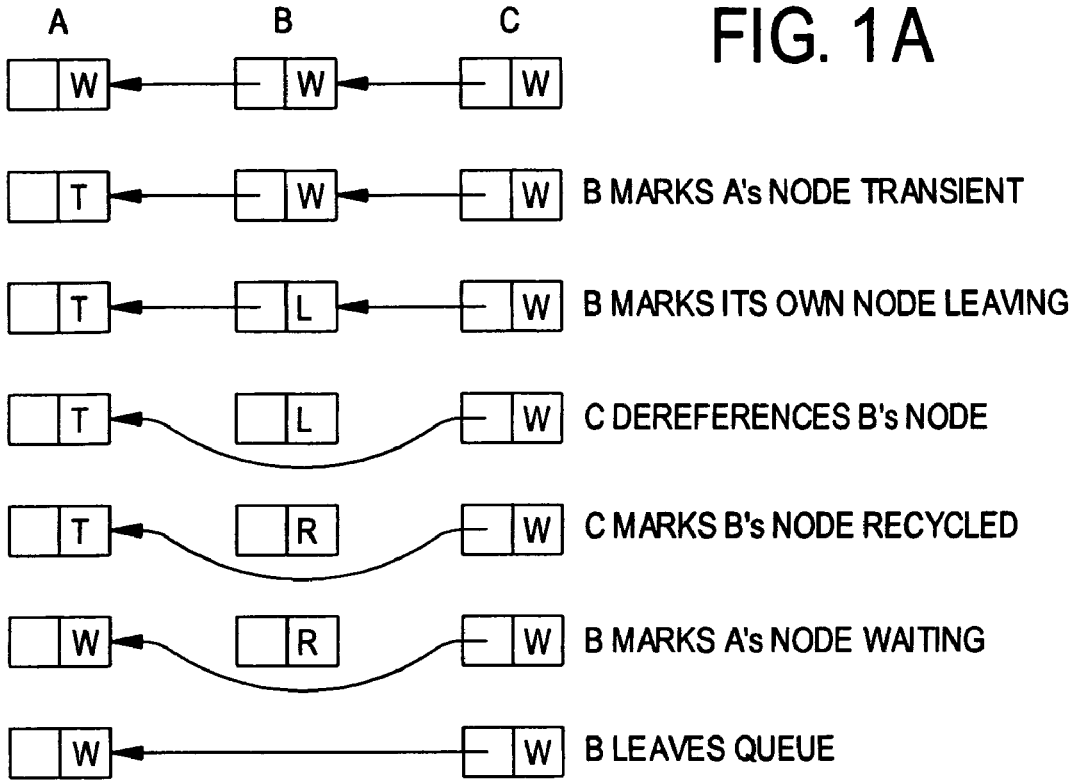
FIG. 1A shows a sequence of operational steps in a timeout in the CLH try lock, in which the departing thread is in the middle of the queue.

Suppose that thread B wishes to leave (time out) and is currently in the middle of the queue. As shown in FIG. 1A, B's intended successor, C, is already spinning on B's queue node. Thus, B can simply mark the node as "leaving." C can then dereference the node to find B's predecessor, A, and mark B's node as recycled, whereupon B can safely leave. There is no race between A and B because A never inspects B's queue node.

Figure 1B:
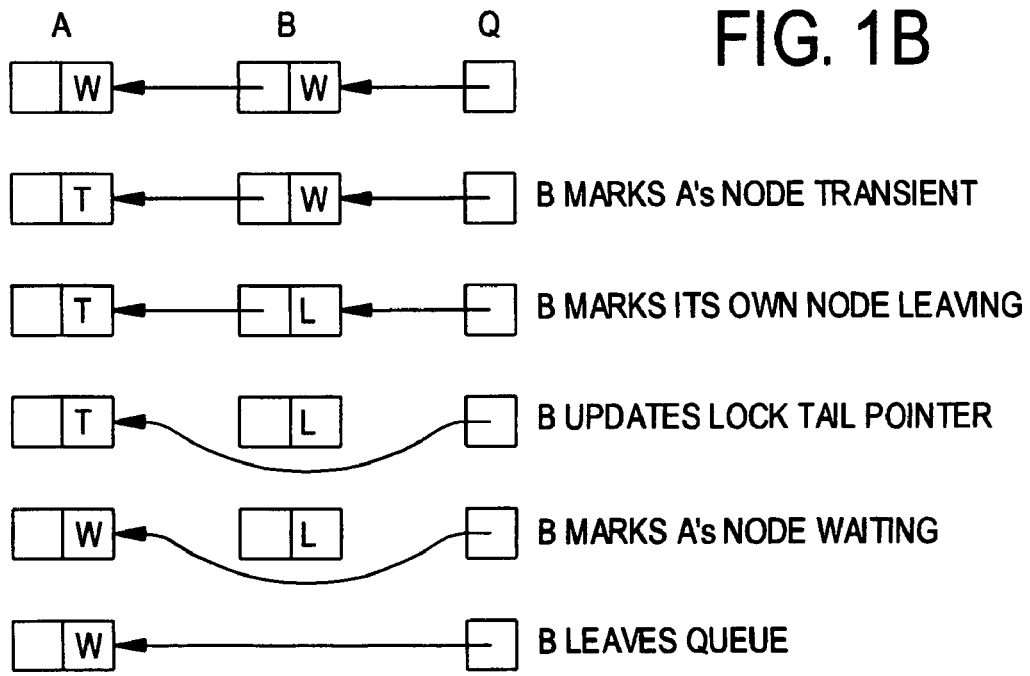
FIG. 1B shows a sequence of operational steps in a timeout in the CLH try lock, in which the departing thread is at the end of the queue.

Complications arise in the situation of FIG. 1B, in which the departing thread B is the last thread in the queue. In this case, B must attempt to modify the queue's tail pointer to refer to A's queue node rather than its own. We can naturally express that attempt with a compare_and_swap operation. If that operation fails, we know that another thread C has arrived. At this point we might hope to revert to the previous case of FIG. 1A. However, it is unfortunately possible that C may successfully leave the queue after B's compare_and_swap, at which point B may wait indefinitely for a handshake that never occurs. We could protect against the indefinite wait by repeatedly checking the queue's tail pointer, but that would constitute spinning on a non-local location, something we want to avoid.

That problem can be solved by requiring C to handshake with B in a way that prevents B from trying to leave the queue while C is in the middle of leaving. In the middle-of-queue case, as shown in FIG. 1A, B can leave the middle of the queue as soon as it receives confirmation from C that no pointer to its queue node remains. In the end-of-queue case, as shown in FIG. 1B, B can leave the end of the queue once it has updated the tail pointer, Q, using compare_and_swap. The transitions from waiting to leaving and from waiting to available (not shown in figure) are also made with compare_and_swap, to avoid overwriting a transient flag.

Like the standard CLH lock, the CLH-try lock depends on cache coherence to avoid remote spinning. In the CLH-try lock, it is possible for two threads to end up spinning on the same location. In the fourth line of FIG. 1B, if thread A calls CLH_release, it will spin until the transient flag reverts to waiting. If a new thread C arrives at about the same time, it too will begin to spin on the flag in A's queue node. When B finally updates the flag, its write will terminate both spins.

The non-blocking variant of the first preferred embodiment is called the CLH-NB try lock. As in the CLH lock and the CLH try lock, a lock variable takes the form of a tail pointer for a singly linked list of queue nodes. A thread that wishes to acquire the lock allocates a node, swaps it into the tail pointer, and then spins on a flag in the node ahead of it in line, which was returned by the swap.

The CLH try lock has been modified in the CLH-NB try lock to allow non-blocking timeout, as will now be explained with reference to FIGS. 1C and 1D. In the CLH-NB try lock, individual queue nodes 102 contain only a single pointer 104. When nil, this pointer indicates that the thread spinning on the node must wait. When set to AVAILABLE (a value we assume to be different from any valid reference), the pointer indicates that the lock is available to the thread spinning on the node. When neither nil nor AVAILABLE, the pointer contains a reference to the previous node in the list, and indicates that the thread that allocated the node containing the pointer has timed out. Up until its decision to time out, a thread maintains its reference to the node on which it is spinning in a local variable, rather than its queue node (indicated in the figure by starting the tail of an arrow 106 in the empty space below a queue node 102).

Figure 1C:
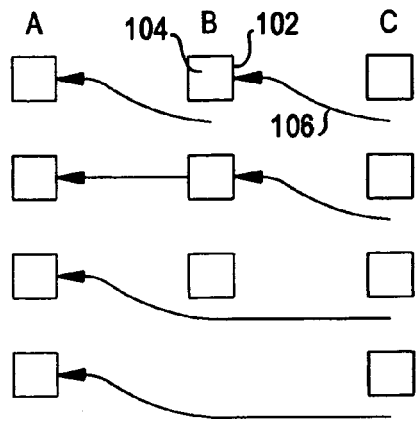
FIG. 1C shows a sequence of operational steps in a timeout in the CLH-NB try lock, in which the departing thread is in the middle of the queue.
Figure 1D:
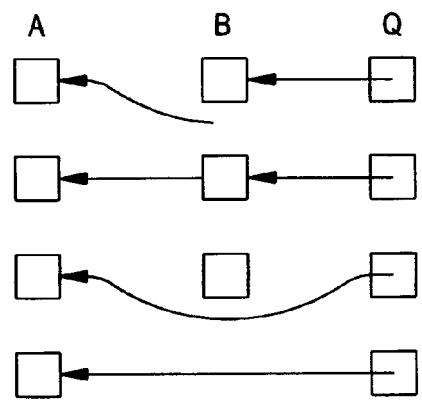
FIG. 1D shows a sequence of operational steps in a timeout in the CLH-NB try lock, in which the departing thread is at the end of the queue.

In the event of timeout, two principal cases arise, illustrated in FIGS. 1C and 1D. In FIG. 1C, departing thread B is in the middle of the queue, spinning on the pointer in the node allocated by thread A. When B times out, it indicates its intent to leave by storing into its own queue node a reference to A's node. Thread C, which is spinning on B's node, notices this change. It updates its own local pointer to refer to A's node instead of B's, and then reclaims B's node.

Unfortunately, B cannot be certain that C exists. The case where it does not is illustrated in FIG. 1D. After writing the reference to A's queue node into its own queue node, B performs a compare_and_swap on the queue tail pointer, in an attempt to change it from a reference to B's node into a reference to A's node. In the middle-of-the-queue case of FIG. 1C, this operation will fail. In the end-of-the-queue case of FIG. 1D, it succeeds, and B knows that it can reclaim its own queue node. In either case B can return as soon as it has attempted the compare_and_swap; it does not have to wait for C. If the compare_and_swap failed, B's queue node will not be available for reuse until it is reclaimed by C, or by some other, later thread, if C has also timed out.

The CLH-NB try lock includes one additional departure from the original CLH lock. By analogy to the end-of-queue case for timeout, we can eliminate the extra, "dummy" node in an unheld lock by performing a compare_and_swap in the release operation. This extra atomic operation increases the overhead of every critical section, but reduces by the size of a queue node the space required for an unheld lock.

Because reclaimed queue nodes may be reused, we must be careful to avoid the so-called ABA problem, in which a reference to a newly allocated node is mistaken for a reference to a previously reclaimed node. Specifically, once thread B writes a reference to X into node Y, B's successor may reclaim Y. If Y's space is recycled quickly and used for some new queue node Y', which is used in an attempt to acquire the same lock for which Y was used, B's compare_and_swap may succeed when it should not. We can avoid this possibility, in this particular case, by using a memory allocator in which a given block of storage is always allocated by the same thread. Then Y's space, which was allocated by B, will be reused only by B, and only after B has attempted the compare_and_swap in which the ABA problem arises.

The second preferred embodiment (variant with blocking timeout) is called the MCS try lock. It is based on the earlier MCS lock of Mellor-Crummey and Scott ("Algorithms for scalable synchronization on shared-memory multiprocessors," *ACM Transactions on Computer Systems*, Vol. 9, No. 1, pp. 21–65, February 1991).

As in the CLH lock, an MCS lock variable takes the form of a tail pointer for a list of queue nodes, but where the CLH queue is linked from tail to head, the bulk of the MCS queue is linked from head to tail. After swapping a reference to its own queue node into the tail pointer, a thread writes an additional reference to its node into the next pointer of its predecessor's node. It then proceeds to spin on its own node, rather than the predecessor's node. This "backward" linking allows a thread to spin on a location that is guaranteed to be local even on a non-cache-coherent machine. Unfortunately, it also makes timeout significantly more complex.

To leave the queue, a thread B must update the successor pointer in the queue node of its predecessor A so that it points to B's successor C, rather than to B. If C later chooses to leave the queue as well, it will again need to update A's queue node, implying that B must tell it where A's queue node resides. Pointers to both predecessors and successors must therefore reside in the queue nodes in memory, where they can be read and written by neighboring threads. The MCS-try lock therefore employs a doubly linked queue.

Figure 2A:
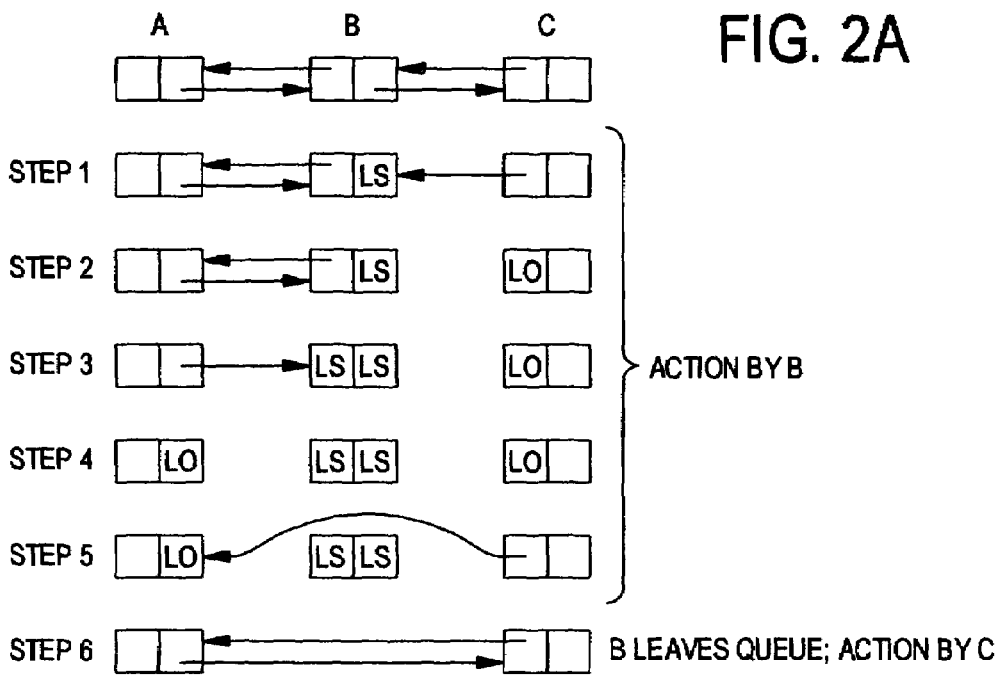
FIG. 2A shows a sequence of operational steps in a timeout in the MCS try lock, in which the departing thread is in the middle of the queue.
Figure 2B:
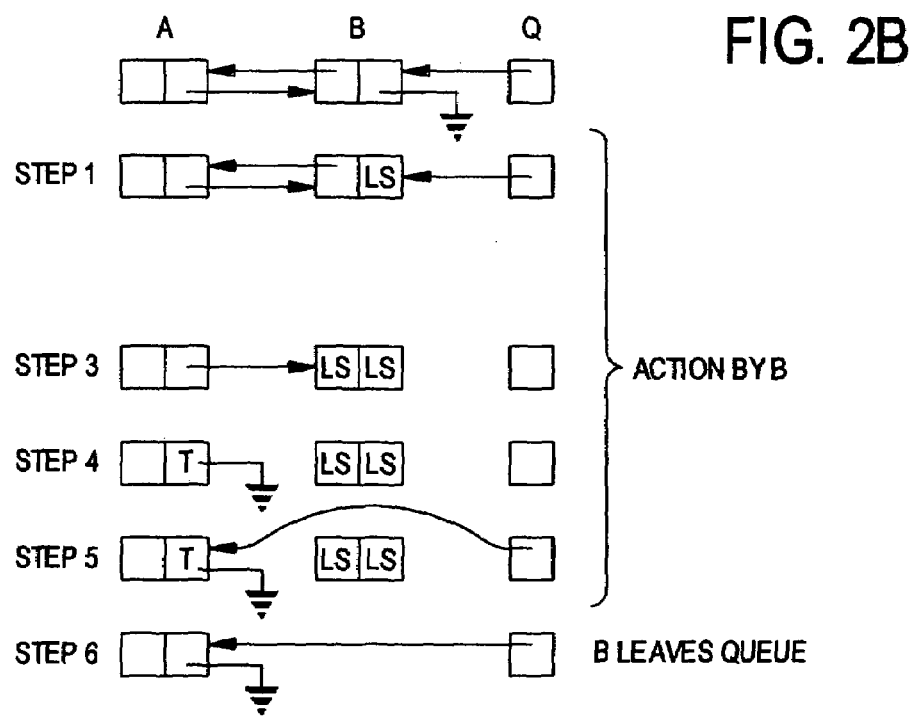
FIG. 2B shows a sequence of operational steps in a timeout in the MCS try lock, in which the departing thread is at the end of the queue.

As in the CLH-try lock, there are two principal cases to consider, depending on whether the departing thread B is currently in the middle of the queue, as illustrated in FIG. 2A, or at the end of the queue, as illustrated in FIG. 2B. While waiting to be granted the lock, a thread ordinarily spins on its predecessor pointer. In the middle-of-the-queue case, departing thread B first replaces the four pointers into and out of its queue node, respectively, with leaving_other and leaving_self flags (shown as LO and LS in the figures). It then updates C's predecessor pointer and relies on C to update A's successor pointer. In the end-of-the-queue case of FIG. 2B, B "tags" A's nil successor pointer to indicate that additional changes are pending. Absent any race conditions, B eventually clears the tag using compare_and_swap.

Unfortunately, there are many potential races that have to be resolved. The thread at the head of the queue may choose to grant the lock to its successor while the successor is attempting to leave the queue. Two neighboring threads may decide to leave the queue at approximately the same time. A thread that is at the end of the queue in step 2 may discover in step 5 that it now has a successor. In general, the order of updates to pointers is chosen to ensure that (1) no thread ever returns from MCS_try_acquire until we are certain that no pointers to its queue node remain and (2) if two adjacent threads decide to leave concurrently, the one closer to the front of the queue leaves first.

Figure 2C:
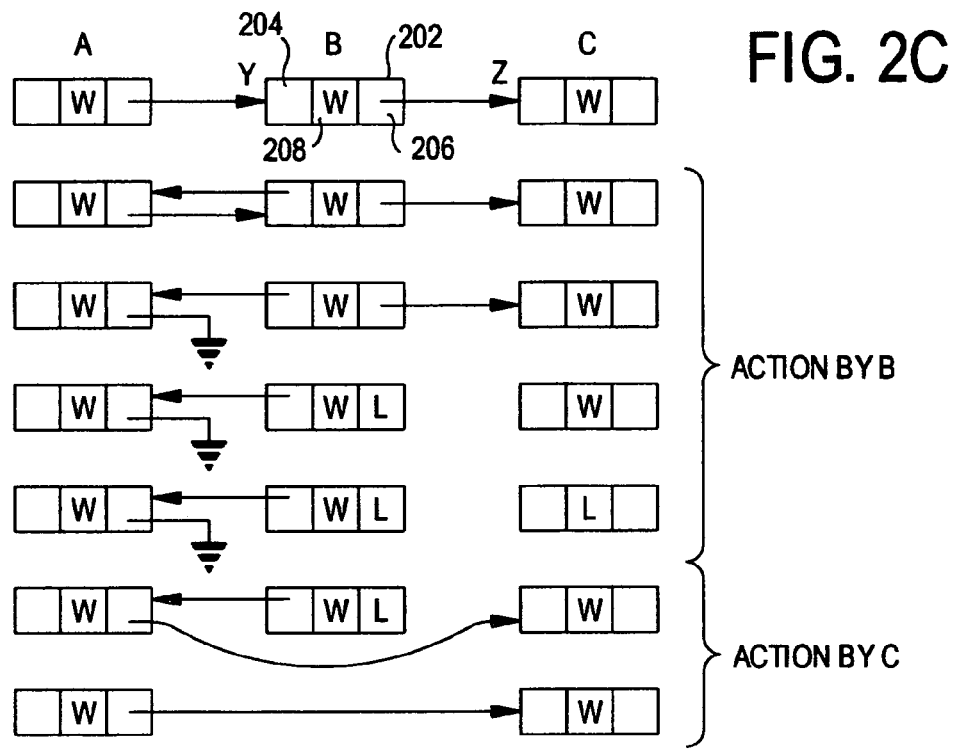
FIG. 2C shows a sequence of operational steps in a timeout in the MCS-NB try lock, in which the departing thread is in the middle of the queue.
Figure 2D:
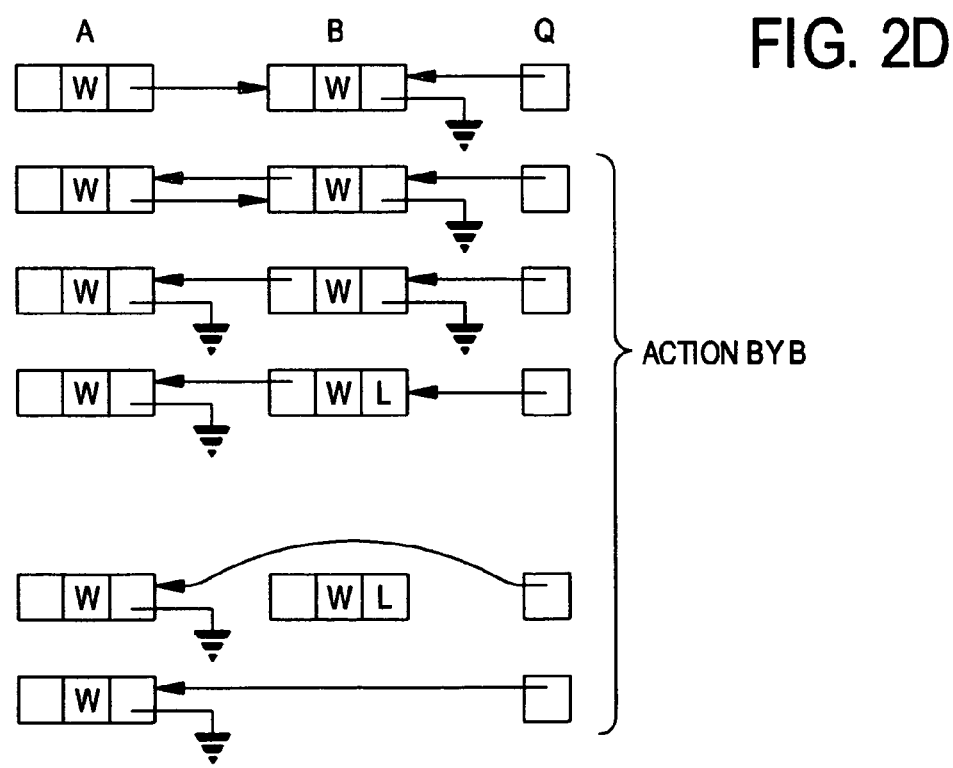
FIG. 2D shows a sequence of operational steps in a timeout in the MCS-NB try lock, in which the departing thread is at the end of the queue.

The non-blocking variant of the second preferred embodiment, called the MCS-NB try lock, will be explained with reference to FIGS. 2C and 2D. Each node 202 in the queue includes a pointer 204 to a previous queue node, a pointer 206 to a next queue node, and a status flag 208, which are used in the manner explained below.

To release a standard MCS lock, a thread attempts to follow its next pointer and update the word on which its successor is spinning. If the pointer is still nil, the thread performs a compare_and_swap on the lock tail pointer, in an attempt to replace a pointer to its own node with a nil pointer. If that attempt fails, then some other thread must be in the process of linking itself into the queue. The releasing thread waits for its next pointer to be updated, then follows it and updates the successor's status flag. Like handshaking in the timeout code of the MCS try lock, we must eliminate the spin in release if we are to bound the time required by lock operations.

As in the original MCS lock, the backward (next) pointer in node Y of an MCS-NB try lock (FIG. 2C) allows the thread B that allocated Y to find the node on which a successor thread is spinning. When nil, Y's next pointer indicates that no successor node is known. Three additional values, assumed not to be the same as any valid reference, correspond to special states. When set to AVAILABLE, Y's next pointer indicates that the lock is currently available. When set to LEAVING, it indicates that B has timed out and, further, that no next pointer anywhere refers to Y. When set to TRANSIENT, Y's next pointer also indicates that B has timed out, but that in doing so B was unable to break the reference to Y from its predecessor node.

The status flag of a queue node has five possible values. Before linking its node into the queue, a thread initializes its status flag to waiting. Once the link-in operation is complete, the thread will spin waiting for the value to change. Three possible values—available, leaving, and transient—mirror the special values of node next pointers described in the previous paragraph. The final value—recycled—allows us to address race conditions in which two threads have references to a node that needs to be reclaimed. Whichever thread uses its pointer last will find the recycled flag, and know that it is responsible for reclamation.

When a thread C performs an initial swap on the tail pointer of a lock that is not currently available, it receives back a reference to the queue node Y allocated by C's predecessor, B. C swaps a reference to its own node, Z, into Y's next pointer. By using a swap, rather than an ordinary write (as in the original MCS lock), C can recognize the case in which B decides to release the lock or to leave the queue when C has already swapped itself into the tail of the queue, but before C has updated Y's next pointer. Among other things, this mechanism allows B to release the lock without waiting for C to complete its link-in operation.

If C's swap on Y's next pointer returns AVAILABLE, C knows that it has the lock. Moreover B's compare_and_swap on the lock tail pointer (which it performs in order to cover the case when it is the last thread in the queue) is guaranteed to fail, because C's original swap on the tail pointer removed the reference to Y. C therefore knows that B will neither update Z nor reclaim Y, so C reclaims Y, writes a reference to Z into the head pointer field of the lock, and returns successfully.

If the swap on Y's next pointer returns LEAVING, C knows that B has timed out. It also knows, for reasons similar to those in the preceding paragraph, that B will neither update Z nor reclaim Y. C updates its private precedessor pointer to contain the reference found in Y's predecessor pointer, instead of a reference to Y. C then reclaims Y and tries again to link itself into line.

Finally, if the swap on Y's next pointer returns TRANSIENT, C knows that B has timed out, but that B's predecessor, A, has a reference to Y, and is planning to use it. Whichever thread, A or C, accesses Y last will need to reclaim it. C swaps a recycled value into Y's status flag. If the return value of the swap is waiting, C knows that it has accessed Y before A, and that A will take responsibility for reclaiming it. If the return value of the swap is available, leaving, or transient, however, C knows that A has already accessed Y. C therefore reclaims Y. In either case, C updates its private predecessor pointer and tries to link itself into line again, as in the preceding paragraph. Seen from A's perspective, any time we update the status flag of a successor queue node we use a swap operation to do so, and reclaim the node if the return value is recycled.

Once successfully linked into the queue, thread C spins on the status flag in its own queue node, Z. If that word changes to available, C writes a reference to Z into the head pointer field of the lock, and returns successfully. If Z's status flag changes to leaving or transient, C resets it to waiting and then behaves as it would have in the preceding paragraphs, had it found LEAVING or TRANSIENT in the next pointer of its predecessor's queue node, Y.

If C times out in the algorithm's inner loop, spinning on Z's status flag, it first stores its private predecessor pointer into Z's predecessor pointer. It then attempts to erase the reference to Z found in Y's next pointer, using compare_and_swap. If that attempt succeeds, C swaps LEAVING into Z's next pointer and, if necessary, swaps leaving into the status flag of Z's successor node. As described above, C reclaims the successor node if the status flag was already set to recycled. Finally, if Z appears to have no successor, C attempts to link it out of the end of the queue with a compare_and_swap and, if that operation succeeds, reclaims Z.

If C fails to erase the reference to Z found in Y's next pointer, then it knows its predecessor B will try to update Z's status flag. It therefore swaps TRANSIENT into Z's next pointer and, if necessary, swaps transient into the status flag of Z's successor node, reclaiming that node if its status flag was already recycled. If Z appears to have no successor, then C must simply abandon it, to be reclaimed by some thread that calls the acquire operation at some point in the future.

If C times out in the algorithm's outer loop, while attempting to update a predecessor's next pointer, it mimics the case of timeout in the inner loop: it restores its predecessor's next pointer, sets Z's status to leaving or transient, as appropriate, and then takes the actions described in one of the preceding two paragraphs.

Unfortunately, in order to avoid any spins in timeout code, we must generally return from an unsuccessful CLH-NB_acquire or MCS-NB_acquire operation without having reclaimed our queue node (that task having been left to some successor thread). As a result, we lose the O(L+T) overall space bound of the CLH try lock and the MCS try lock, with L locks and T threads.

Perhaps the simplest pathological scenario occurs in either lock when the last thread in line is preempted. If the second-to-last thread then times out, its node may go unreclaimed for an arbitrarily long time. If the third-to-last thread subsequently times out its node may go unreclaimed as well, and so on.

Figure 3A:
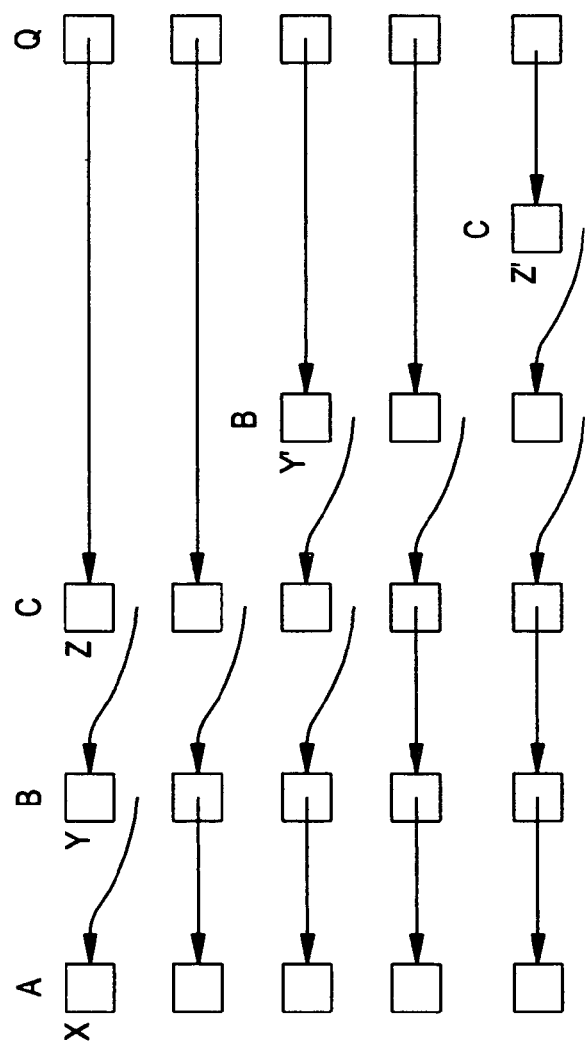
FIG. 3A shows a worst-case scenario for space in the CLH-NB try lock.

Worst-case space needs are in fact unbounded, with as few as three active threads in the CLH-NB try lock (FIG. 3A). Suppose initially that threads A, B, and C are waiting for the lock. Suppose then that B and C decide to leave at approximately the same time and stop spinning on nodes X and Y. B then writes a reference to X into Y, but C is preempted before it can write a reference to Y into Z. B's compare_and_swap on the lock tail pointer will fail, because Z is in the way, and B will return from acquire without having reclaimed Y. If B requests the lock again it will get into line with a new queue node; call it Y'. Suppose that B then times out again, decides to leave the queue, and stops spinning on Z. Only now, let us suppose, does C wake up again and write a reference to Y into Z. C's compare_and_swap on the lock tail pointer will fail because Y' is in the way, and C will return from acquire without having reclaimed Z. This scenario can, in principle, repeat indefinitely. A similar scenario exists for the MCS-NB try lock.

Figure 3B:
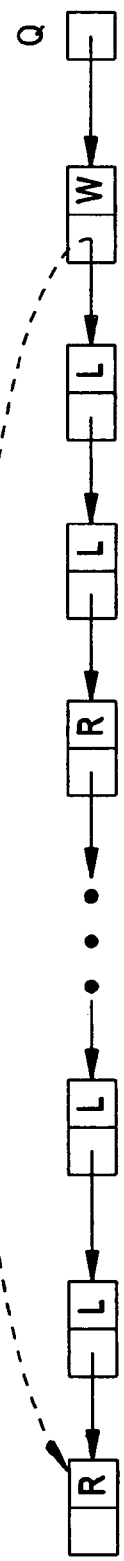
FIG. 3B shows an impossible scenario for non-blocking timeout and constant space per thread.

Ideally, one might hope to design a queue-based spin lock with non-blocking timeout and an O(L+T) space bound, but it appears that no such lock is possible. Imagine a lock on which N threads are waiting (FIG. 3B). Suppose now that N—2 of these threads—all but the first and the last—decide to leave at essentially the same time. Imagine further that the last thread in line has been preempted, and that the first thread, which has the lock, is in a very long critical section. The departing threads would all like to complete their timeout operations in a bounded number of their own local time steps. In order to reclaim space while maintaining the integrity of the queue, we must arrange to introduce the remaining threads (the first and the last) to each other. But because the queue embodies only local knowledge, we must perform O(N) work in order to make this introduction. While a hypothetical highly clever algorithm might be able to perform this work in O(log N) time using a parallel prefix-like strategy, it seems clear we cannot do it in constant time.

It would be easy, of course, to obtain an O(L×T) overall space bound, by remembering the last queue node used by thread T in its attempt to acquire lock L. The next time T tried to acquire L it could check to see if the node were still in L's queue, in which case T could resume waiting where it was when it last timed out. This mechanism would have significant time cost, however, and seems unwarranted in practice.

Performance results will now be disclosed.

In a first set of performance tests, the test-and-test_and_set (TATAS), CLH, CLH-NUMA, MCS, CLH try, and MCS try locks were implemented using the swap and compare_and_swap operations available in the Sparc V9 instruction set. (The CLH-NUMA lock was described by Craig in the above-cited Univ. of Washington technical report. It uses an extra level of indirection to ensure that spins are local even on a non-cache-coherent machine.) Initial testing and single-processor results employed a 336 MHz Sun Ultra 4500. Scalability tests were conducted on a 56-processor Sun Wildfire machine (not to be confused with the Compaq product of the same name) with 250 MHz processors. Architecturally, the Wildfire machine consists of four banks of up to 16 processors, each connected by a central crossbar. Backoff constants for the TATAS lock were tuned separately for each machine.

The tests employed a microbenchmark consisting of a tight loop containing a single acquire/release pair. Aside from counting the number of iterations and the number of successful acquires (these may be different in the case of a try lock), the loop does no useful work. Machines used for tests were otherwise unloaded.

One can obtain an estimate of lock overhead in the absence of contention by running the microbenchmark on a single processor, and then subtracting the loop overhead. Results on the Ultra 4500 are as follows:

TABLE I

| TATAS | 137 ns |
|---|---|
| MCS | 172 ns |
| CLH | 137 ns |
| CLH-NUMA | 262 ns |
| MCS-try | 256 ns |
| CLH-try | 274 ns |

In an attempt to avoid perturbation due to other activity on the machine, minima were measured over a series of several runs. As one might expect, none of the more complex locks is able to improve on the time of the TATAS lock, though the CLH lock ties it. The extra 35 ns overhead in the MCS lock is due primarily to the compare_and_swap in MCS_release. The CLH-try and MCS-try locks pay and additional penalty for the extra argument to their acquire operations and, in the case of CLH-try, the compare_and_swap in CLH_release. Neither of the try locks calls the Sun high-resolution timer if it is able to acquire the lock immediately. Each call to the timer consumes an additional 250 ns.

One can obtain an estimate of the time required to pass a lock from one processor to another by running the microbenchmark on a large collection of processors. This passing time is not the same as total lock overhead; as discussed in the above-cited paper by Magnussen, Landin, and Hagersten, queue-based locks tend toward heavily pipelined execution, in which the initial cost of entering the queue and the final cost of leaving it are overlapped with the critical sections of other processors.

Figure 4A:
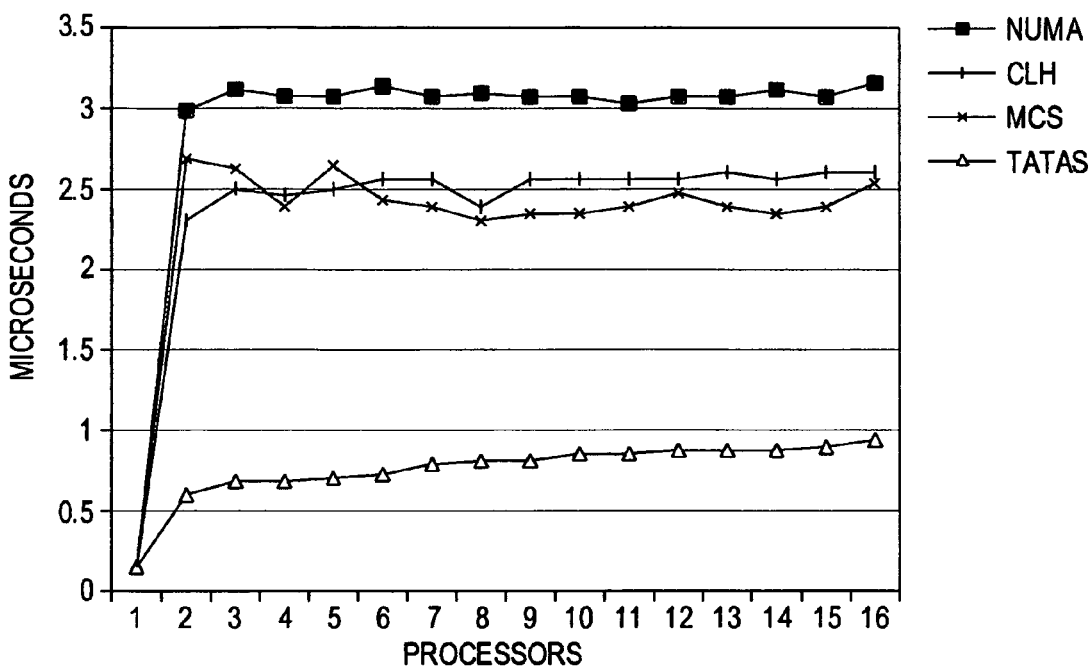
FIG. 4A shows microbenchmark iteration time for non-try locks on a 16-processor Sun Wildfire machine.
Figure 4B:
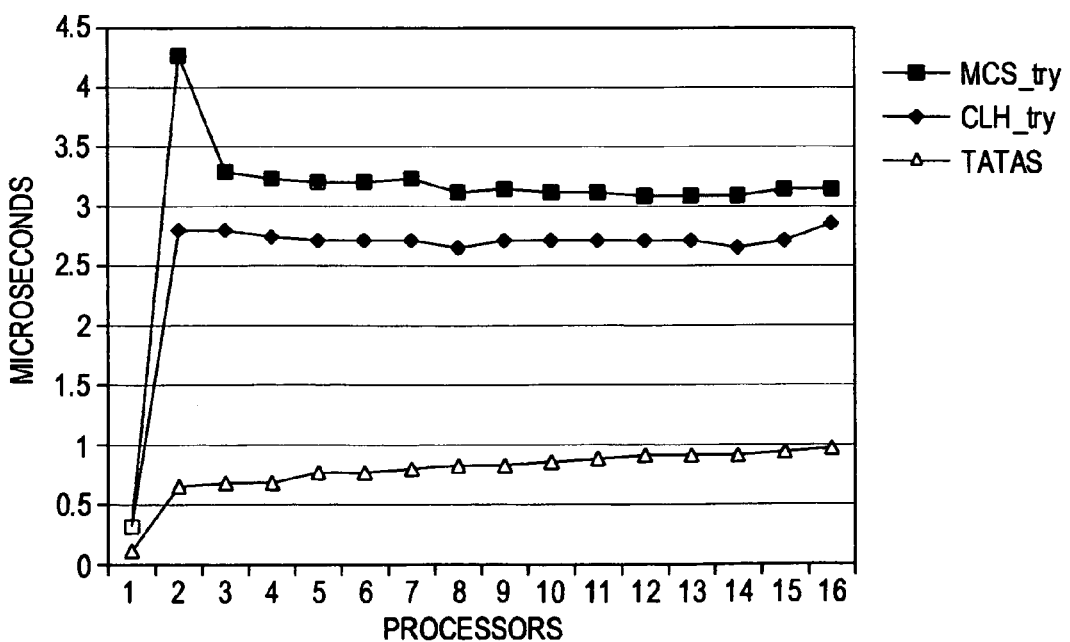
FIG. 4B shows microbenchmark iteration time for try locks on a 16-processor Sun Wildfire machine.

FIGS. 4A and 4B show the behaviors of the five queue-based locks on one bank of the Wildfire machine, with timeout values ("patience") set high enough that timeout never occurs in the queue-based try locks. All tests were run with a single thread on every processor. With only one active processor, the plotted value represents the sum of lock and loop overhead with perfect cache locality. The value for the queue-based locks jumps dramatically with two active processors as a result of coherence misses. With three or more active processors, lock passing is fully pipelined, and the plotted value represents the time to pass the lock from one processor to the next.

Among the non-try locks (FIG. 4A), CLH-NUMA has a noticeably greater passing time (3.1 $\mu$s) than either MCS or CLH. The passing times for MCS and CLH are just about the same, at 2.4 $\mu$s and 2.5 $\mu$s respectively. Both MCS and CLH are faster than either of their try lock counterparts, though at 2.7 $\mu$s, CLH-try beats out the CLH-NUMA lock. At 3.2 $\mu$s, MCS-try has the slowest passing time.

While the TATAS lock appears to be passing much faster than any of the other locks, this result is somewhat misleading. The queued locks are all fair: requests are granted in the order they were made. The TATAS lock, by contrast, is not fair: since the most recent owner of a lock has the advantage of cache locality, it tends to outrace its peers and acquire the lock repeatedly. (This effect would be reduced in a more realistic benchmark, with work outside the critical section.) In our experiments successive acquisitions of a queued lock with high patience occurred on different processors more than 99% of the time; successive acquisitions of a TATAS lock occurred on the same processor about 99% of the time. This unfairness has ramifications for timeout: even with 150 $\mu$s patience (long enough for every processor, on average, to acquire and release the lock 10 times), TATAS still fails to acquire the lock some 4% of the time.

Figure 4C:
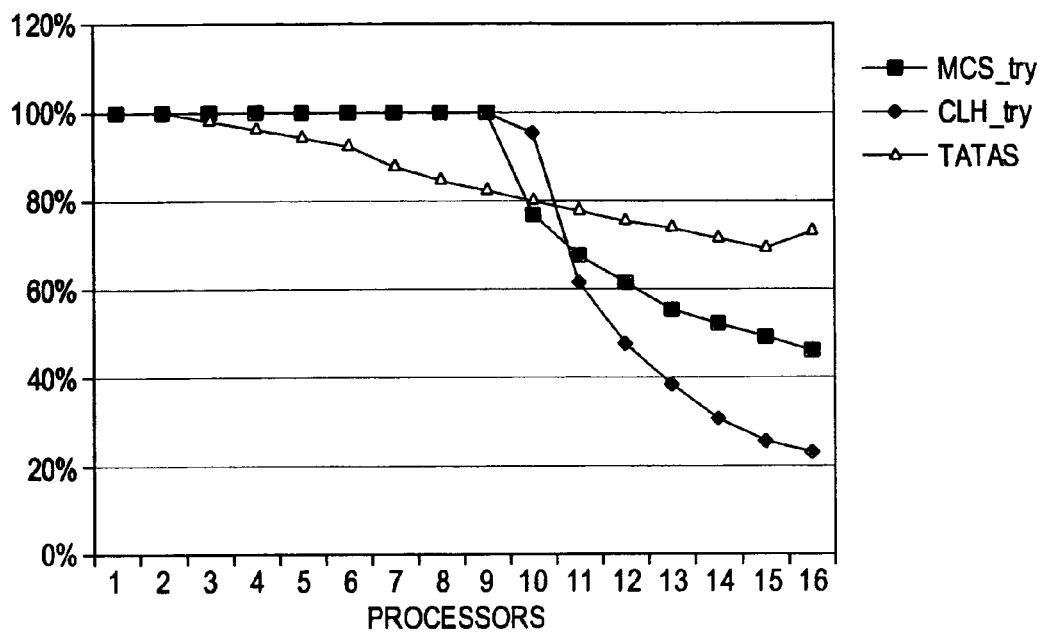
FIG. 4C shows percent acquisition at 25 $\mu$s patience on a 16-processor Sun Wildfire machine.
Figure 4D:
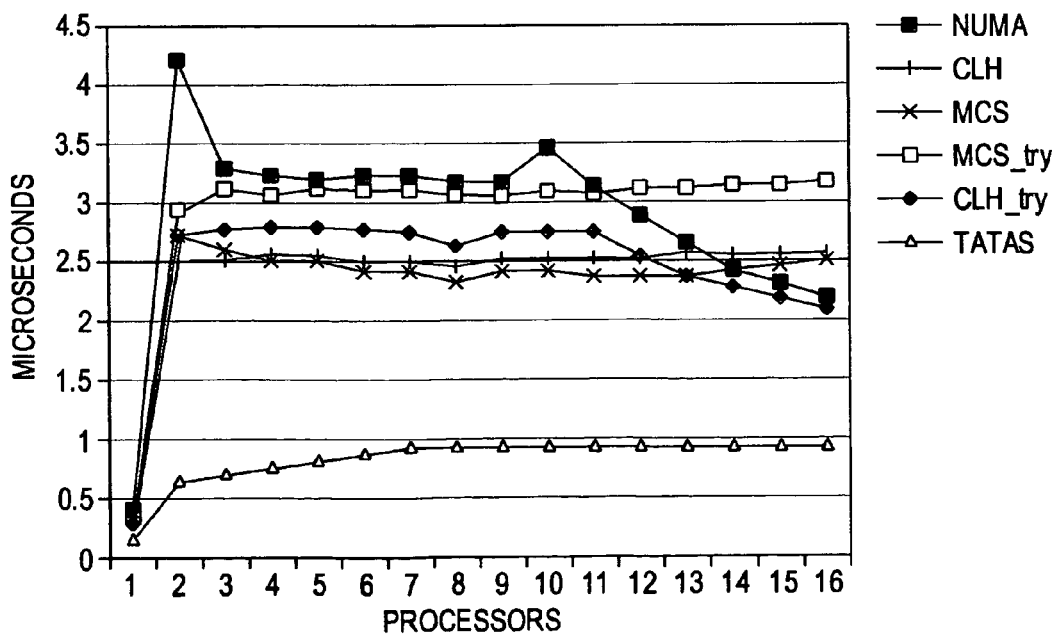
FIG. 4D shows iteration time at 25 $\mu$s patience on a 16-processor Sun Wildfire machine.

FIG. 4C plots the percentage of time that a processor in the microbenchmark succeeded in acquiring a try lock. For this test, the timeout interval (patience) has been set at only 25 $\mu$s. FIG. 4D plots iteration time for the same experiment. With this lower patience level, the MCS-try and CLH-try locks exhibit distinctly bimodal behavior. With nine or fewer active processors, timeout almost never occurs, and behavior mimics that of the non-try locks. With ten or more active processors, timeouts begin to occur.

For higher processor counts, or for lower patience levels, the chance of a processor getting a lock is primarily a function of the number of processors that are in the queue ahead of it minus the number of those that time out and leave the queue before obtaining the lock. As is evident in FIGS. 4C and 4D, this chance drops off sharply with insufficient patience. The average time per iteration also drops, because giving up an attempt to acquire a lock is cheaper than waiting to acquire it.

The tradeoff between MCS-try and plain MCS is as expected: At the cost of higher average iteration time (per attempt), the plain MCS lock always manages to successfully acquire the lock. At the cost of greater complexity, the MCS-try lock provides the option of timing out. The same tradeoff holds between the CLH and CLH-try locks.

The tradeoffs between MCS-try or CLH-try and TATAS are more interesting. While the iteration time is consistently higher for the queue-based locks (FIG. 4D), the acquisition (success) rate depends critically on the ratio between patience and the level of competition for the lock. When patience is high, relative to competition, the queue-based locks are successful all of the time. Once the expected wait time exceeds the timeout interval in the queue-based locks, however, the TATAS lock displays a higher acquisition rate. As will be described below, TATAS is not able to maintain this advantage once we exceed the number of processors in a single bank of the Wildfire machine.

Figure 4E:
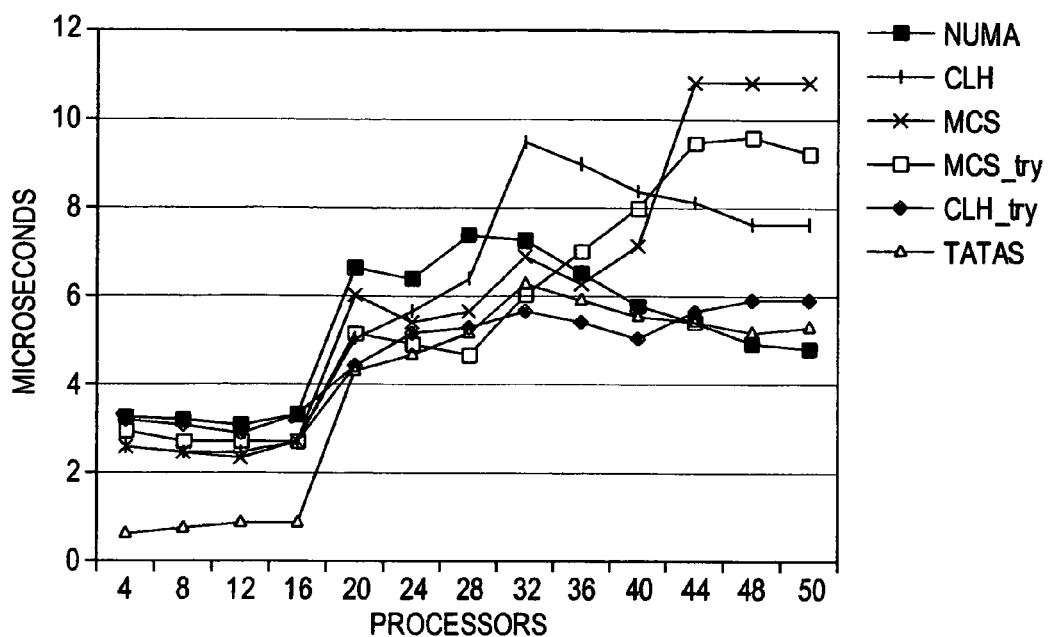
FIG. 4E shows iteration time at 200 $\mu$s patience on a 56-processor Sun Wildfire machine.

Generally speaking, the results for larger numbers of processors are comparable to those seen within a single bank of the machine. Although crossing the interconnect between banks introduces a fair amount of noise into the timing results (see FIGS. 4E and 4F), the MCS-try and CLH-try locks continue to have very similar iteration times, with MCS-try coming out somewhat slower than CLH-try.

Figure 4F:
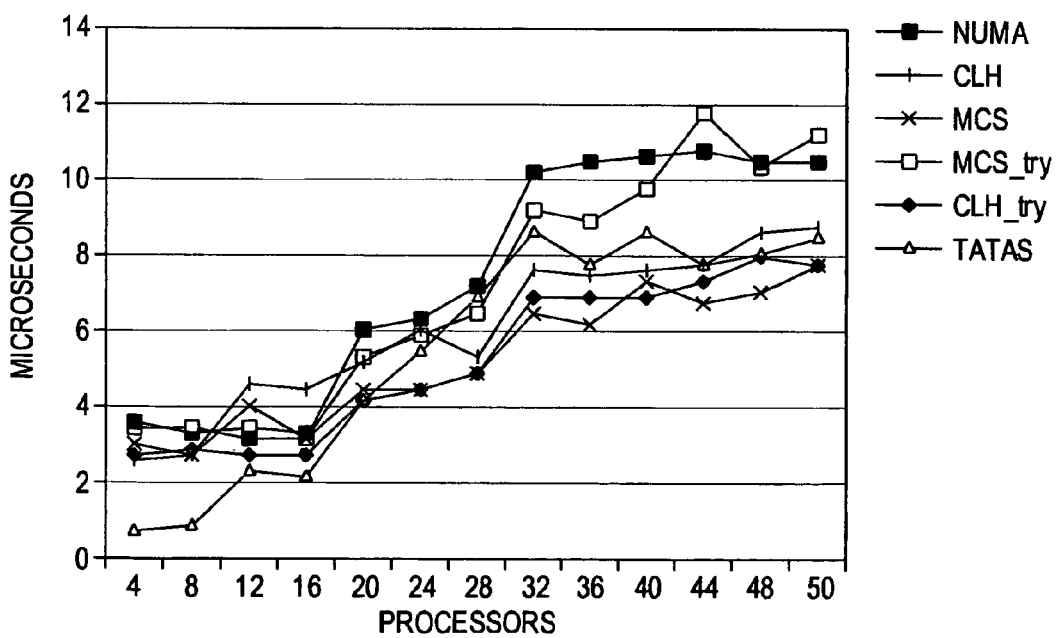
FIG. 4F shows iteration time at 500 $\mu$s patience on a 56-processor Sun Wildfire machine.

The influence of the interconnect is particularly evident in the MCS-try iteration time in FIG. 4F: an additional bank of processors, requiring additional traversals of the interconnect, comes into play between 16 and 20 processors, and again between 28 and 32 processors. A third transition point, between 40 and 44 processors, is not visible in the figure.

Figure 4G:
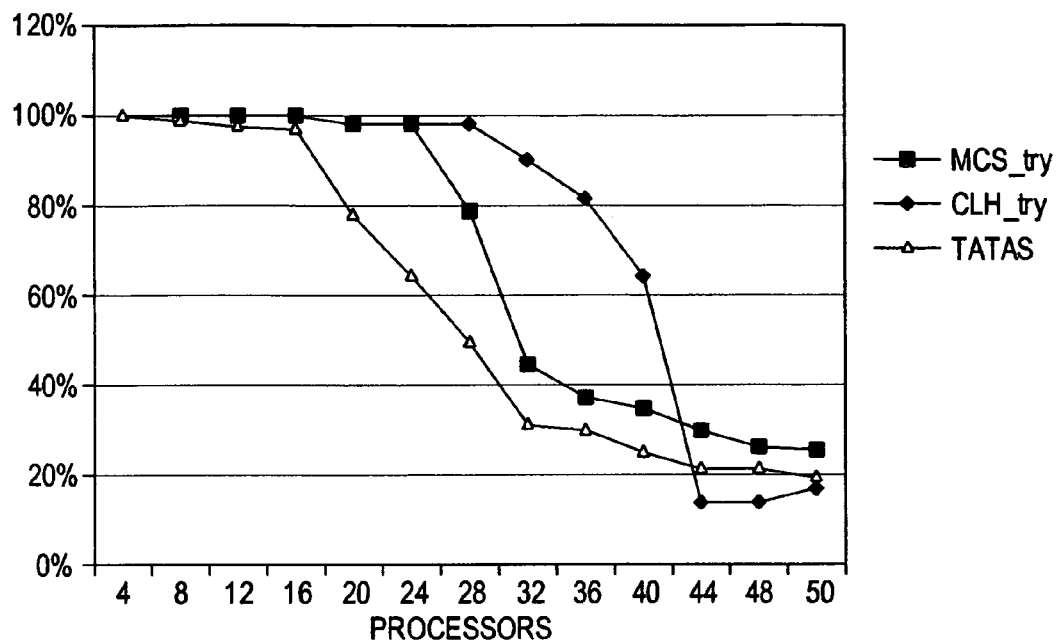
FIG. 4G shows percent acquisition time at 200 $\mu$s patience on a 56-processor Sun Wildfire machine.
Figure 4H:
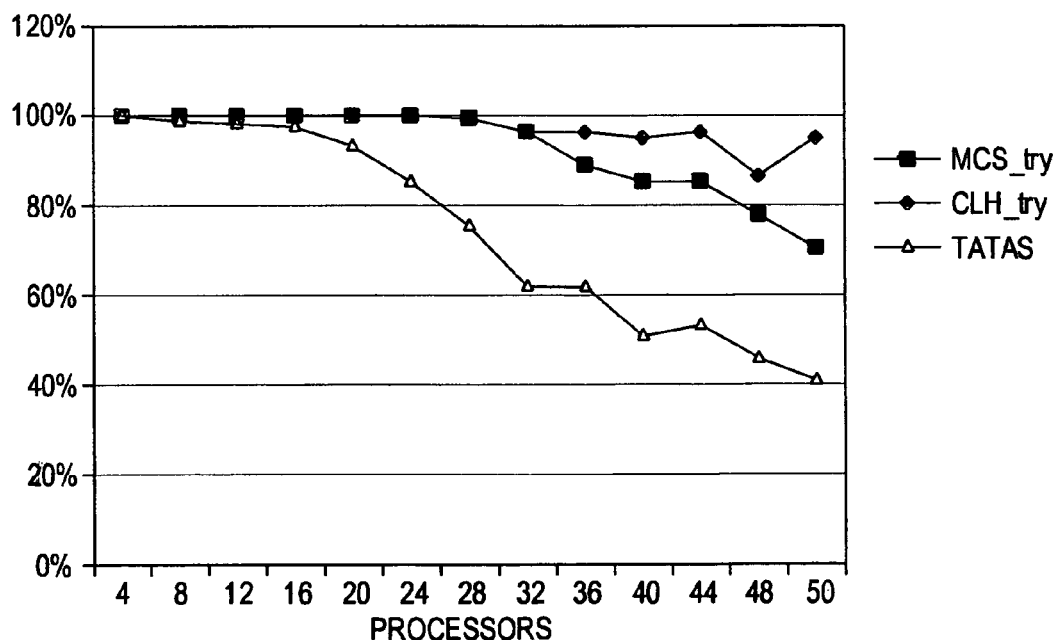
FIG. 4H shows percent acquisition time at 500 $\mu$s patience on a 56-processor Sun Wildfire machine.

FIGS. 4G and 4H show the establishment of a very long pipeline for lock acquisition. While the CLH-try lock sees a lower acquisition rate than the MCS-try lock at very high levels of competition relative to patience (FIG. 4G), there is a significant intermediate range where its acquisition rate is higher (FIG. 4H and the center of FIG. 4G).

In a second set of performance tests, eight different lock algorithms have been implemented, again using the swap and compare_and_swap operations available in the Sparc V9 instruction set: TAS-B, TAS-B try, CLH, CLH try, CLH-NB try, MCS, MCS try, and MCS-NB try. (The TAS-B try lock in this set of experiments is identical to the TATAS lock in the previous set.) The second set of experiments again employs a microbenchmark consisting of a tight loop containing a single acquire/release pair. In addition, this microbenchmark includes optional timed "busywork" inside and outside the critical section.

Acquire and release operations are implemented as inline subroutines wherever feasible. Specifically: for CLH and MCS both acquire and release are inlined. For TASB, TAS-B try, and CLH try, inlining is used for release and the "fast path" of acquire (with an embedded call to a true subroutine if the lock is not immediately available). For MCS try inlining is used for the fast path of both acquire and release. For CLH-NB try and MCS-NB try the need for dynamic memory allocation forces both acquire and release to be implemented as true subroutines.

Figure 8:
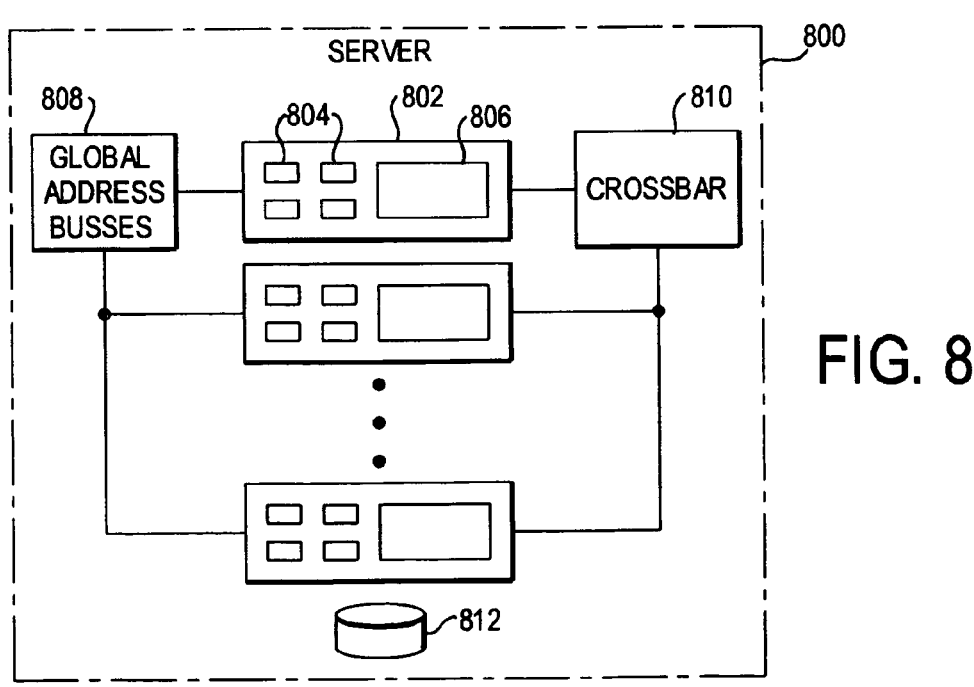
FIG. 8 shows a schematic diagram of a system on which either of the preferred embodiments (in either variant) can be implemented.

Performance results were collected on an otherwise unloaded 64-processor Sun Enterprise 10000 multiprocessor, with 466 MHz Ultrasparc 2 processors. Assignment of threads to processors was left to the operating system. Code was compiled with the –O3 level of optimization in gcc version 2.8.1, but was not otherwise hand-tuned. Architecturally, the Enterprise 10000 is a cache-coherent non-uniform memory access (CC-NUMA) machine. As shown in FIG. 8, such a server 800 has 16 system boards 802, each of which contains 4 processors 804 and a portion 806 of the global memory. Coherence is implemented via snooping on 4 independent global address buses 808. Data is transferred over a separate 16× 16 crossbar 810. The server 800 also can access a storage medium 812 on which the code to implement the try lock can be supplied.

As in the first set of experiments, one can obtain an estimate of lock overhead in the absence of contention by running the microbenchmark on a single processor, with no critical or non-critical "busywork", and then subtracting out the loop overhead. Results appear in table II below. The first column gives measured processor cycles on the Enterprise 10000. In an attempt to avoid perturbation due to kernel activity, minima are reported over a series of 8 runs. The remaining columns indicate the number of atomic operations (swaps and compare_and_swaps), shared-memory reads, and shared-memory writes found in the fast path of each algorithm. The times for the CLH-NB and MCS-NB try locks include dynamic allocation and deallocation of queue nodes.

TABLE II

|  | cycles | atomic ops | reads | writes |
| --- | --- | --- | --- | --- |
| TAS-B | 19 | 1 | 0 | 1 |
| TAS-B try | 19 | 1 | 0 | 1 |
| CLH | 35 | 1 | 3 | 4 |
| CLH try | 67 | 2 | 3 | 3 |
| CLH-NB try | 75 | 2 | 3 | 4 |
| MCS | 59 | 2 | 2 | 1 |
| MCS try | 59 | 2 | 2 | 1 |
| MCS-NB try | 91 | 3 | 3 | 4 |

As one might expect, none of the queue-based locks is able to match the time of the TAS-B lock. The closest competitor, the original CLH lock, takes nearly twice as long. Atomic operations are the single largest contributor to overhead. The CLH-NB try and MCS-NB try locks, which are not inlined, also pay a significant penalty for subroutine linkage.

The importance of single-processor overhead can be expected to vary from application to application. It may be significant in a database system that makes heavy use of locks, so long as most threads inspect independent data, keeping lock contention low. For large scientific applications, on the other hand, single-processor overhead—lock overhead in general—is dwarfed by waiting time at contended locks, and is therefore not a significant concern.

By running the microbenchmark on a large collection of processors one can again obtain an estimate of the time required to pass a lock from one thread to another. Because the initial cost of entering the queue and the final cost of leaving it are overlapped with the critical sections of other processors one should subtract from the resulting iteration times only the critical section "busywork", not the loop overhead or other non-critical work.

Figure 5A:
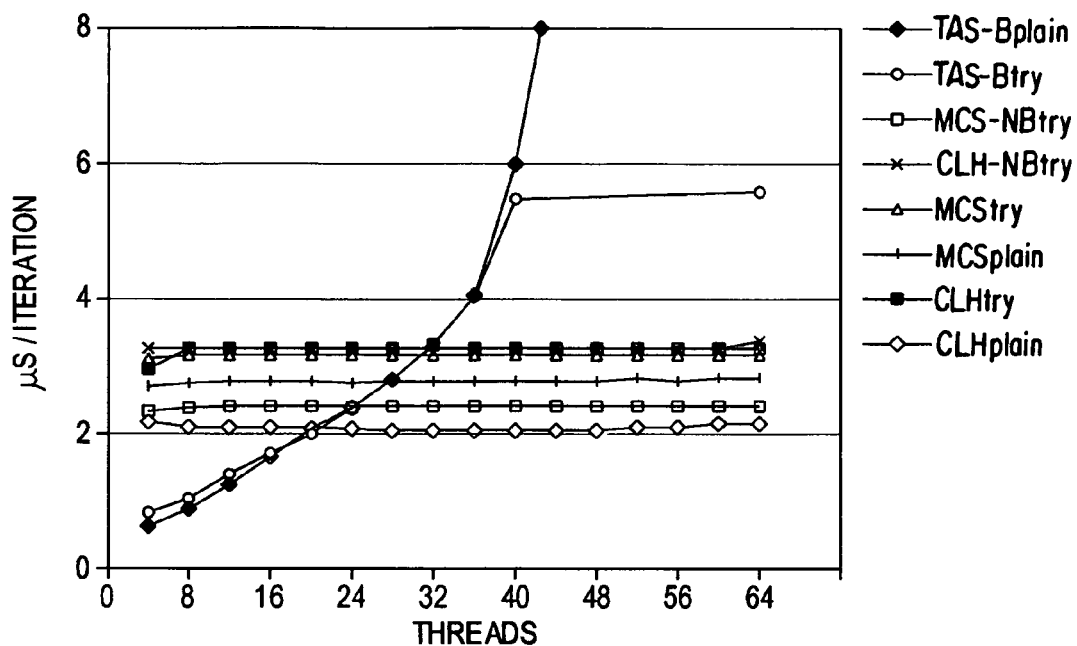
FIG. 5A shows microbenchmark net iteration time on a 64-processor Sun Enterprise machine.
Figure 5B:
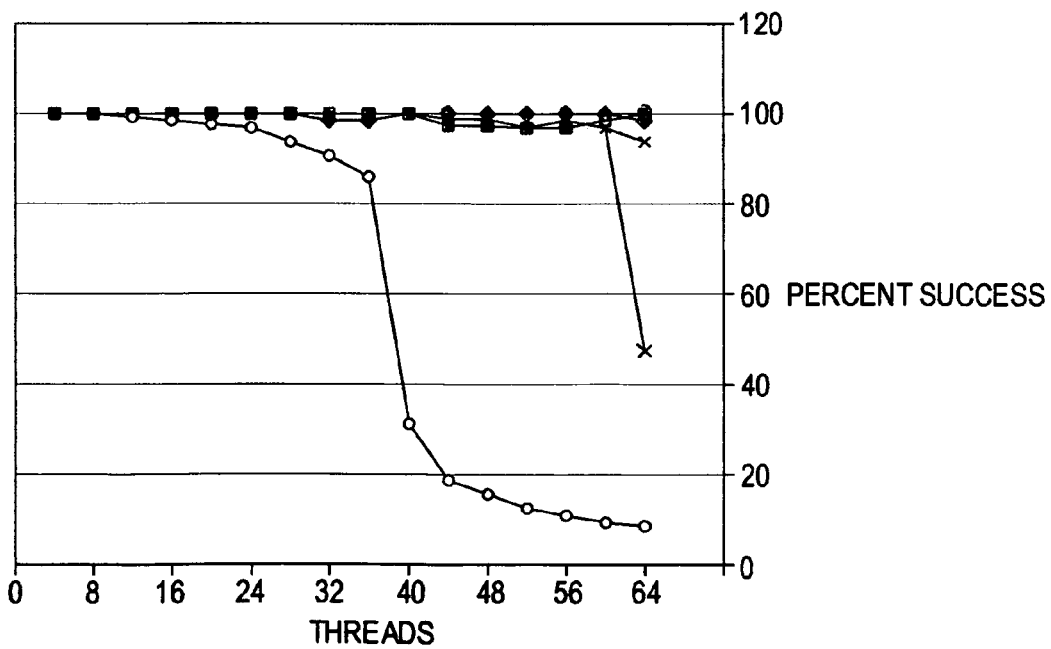
FIG. 5B shows microbenchmark success rate on a 64-processor Sun Enterprise machine.

FIGS. 5A and 5B show the net iteration time and success rate, respectively, of all eight locks on the Enterprise 10000, with timeout threshold (patience) of 225 $\mu$s, non-critical busywork of 440 ns (50 iterations of an empty loop), and critical section busywork of 229 ns (25 iterations of the loop). With a lock-passing time of about 3.4 $\mu$s in the MCS-NB try lock, there is not quite enough time to finish 63 critical sections before the 64th thread times out ((3400+229)×63>225,000). As a result, the success rate of the MCS-NB try lock drops sharply at the right end of the graph, and the CLH-NB try lock is just reaching the dropoff point. The TAS-B try lock, on the other hand, suffers a severe increase in passing time around 36 processors, with a corresponding drop-off in success rate. Passing time for the TAS-B lock without timeout has been omitted beyond 40 processors so as not to distort the scale of the graph. At 64 processors it is 45.0 $\mu$s.

Below about 20 processors the TAS-B locks appear to outperform all competitors, but this appearance is somewhat misleading. The queued locks are all fair: requests are granted in the order they were made. The TAS-B lock, by contrast, is not fair: since the most recent owner of a lock has the advantage of cache locality, it tends to outrace its peers and acquire the lock repeatedly. At 20 processors, in fact, the TAS-B locks are "handed off" from one processor to another only about 30% of the time, despite the fact that each thread performs 440 ns of busywork between its critical sections. Not until more than 36 processors are active does the handoff rate rise above 50%. System designers considering the use of a TAS-B lock may need to consider whether this unfairness is acceptable in the event of severe contention.

In an attempt to assess the benefits and cost of non-blocking timeout, results were also collected on a preemptively scheduled system with more threads than processors. Specifically, the microbenchmark was run with 8–16 threads on an 8-processor Sun Enterprise 4500, a symmetric multiprocessor with 336 MHz processors and separate split-transaction buses for addresses (snooping) and data. With increasing numbers of threads comes an increasing chance of preemption, not only in the critical section, but also while waiting in the queue. Under these circumstances one would expect the CLH-NB and MCS-NB try locks to outperform the handshake-based CLH and MCS try locks. The obtained results confirm this expectation.

Figure 6A:
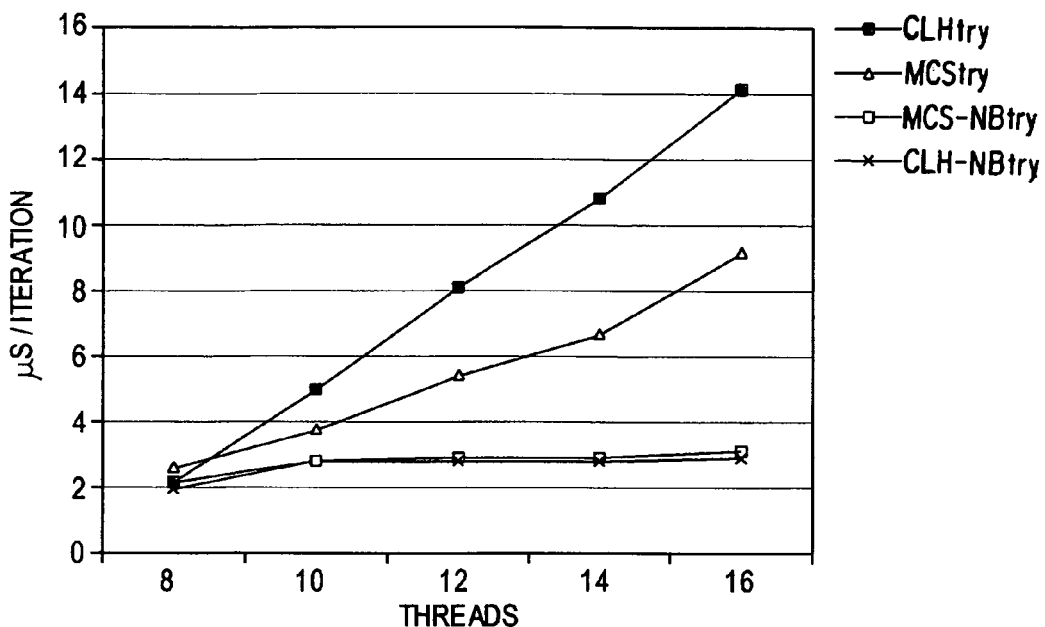
FIG. 6A shows microbenchmark net iteration time on an overburdened 8-processor machine.
Figure 6B:
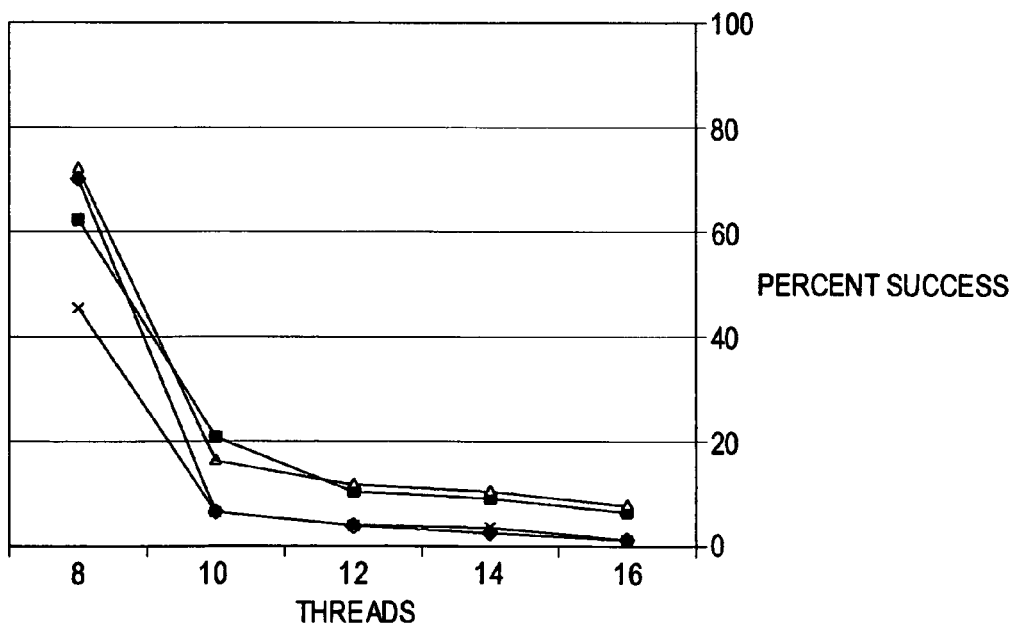
FIG. 6B shows microbenchmark success rate on the overburdened 8-processor machine.

FIGS. 6A and 6B plot iteration time and acquire success rate, respectively, against number of threads for the preemption sensitivity experiment. Results were averaged over 16 runs, each of which performed 100,000 acquire/release pairs per thread. The timeout threshold (patience) was chosen to produce a modestly overloaded system when running with one thread on each of the machine's 8 processors. As discussed below, the meaning of "iteration time" is rather complicated in this experiment. The numbers plotted in FIG. 6A are $T_s$/ti, where $T_s$ is total wall clock time, t is the number of threads, and i is the number of iterations performed by each thread.

As the number of threads exceeds the number of processors, the success rate plummets, due primarily to preemption of threads in their critical sections. The difference between blocking and non-blocking timeout then becomes sharply visible. The CLH-NB and MCS-NB try locks are able to bound the amount of time that a thread spends waiting for an unavailable lock; the CLH and MCS try locks cannot.

One can model iteration time in this experiment in two related ways. First, successful acquire operations introduce critical sections, which exclude one another in time. Total wall clock time should therefore equal the number of successful acquire operations times the average cost (passing time, critical section busywork, and time spent preempted) of a single critical section. Let $T_a$ be lock passing time, $T_c$ be critical section busywork, t again be the number of threads, and i again be the number of iterations executed by each thread. Now measure s, the acquire operation success rate, and $T_s$, the total wall clock time. One can estimate $T_x$, the average time per critical section spent preempted, via the following equations:

$$T_s = sti(T_a + T_c + T_x)$$

$$T_x = \frac{T_s}{sti} - (T_a + T_c)$$

Note that $T_a$ can be estimated based on experiments with ample patience and a dedicated thread per processor.

Second, failed acquire operations and the busy-waiting prior to successful acquire operations occur more-or-less in parallel. Total wall clock time should therefore equal the total number of unsuccessful acquire operations times the average cost (loop overhead, patience, and timeout [handshake] time) of a single failed acquire, plus the total number of successful acquire operations times the average wait time, all divided by the number of processors not busy on the critical path (i.e. one fewer than the total number of processors).

Let m be the number of processors in the machine, $T_p$ be patience, and $T_l$ be loop overhead. If we let $T_w$ represent the average lock wait time, then we can estimate $T_h$, the time required for timeout (including handshaking if necessary) via the following equations:

$$T_s = \frac{ti}{m-1}[T_l + (1-s)(T_p + T_h) + sT_w] \leq \frac{ti}{m-1}[T_l + T_p + (1-s)T_h]$$

$$T_h \geq \frac{(m-1)T_s}{(1-s)ti} - \frac{T_l + T_p}{1-s}$$

This calculation exploits the fact that $T_w \geq T_p$. $T_l$ can be estimated based on single-processor experiments.

Figure 7A:
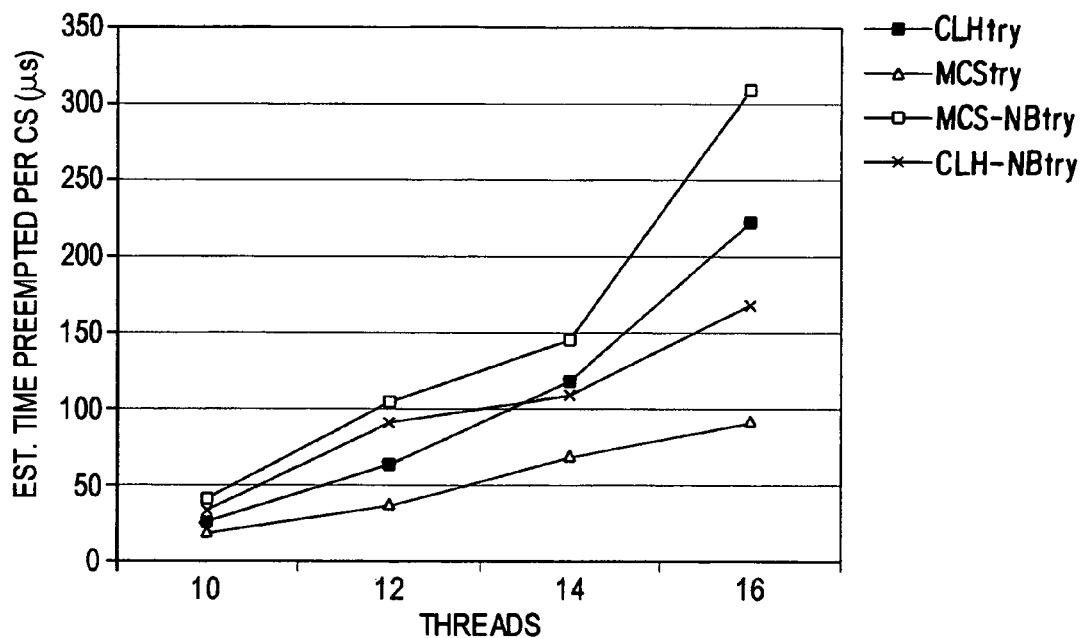
FIG. 7A shows estimated time preempted per critical section.
Figure 7B:
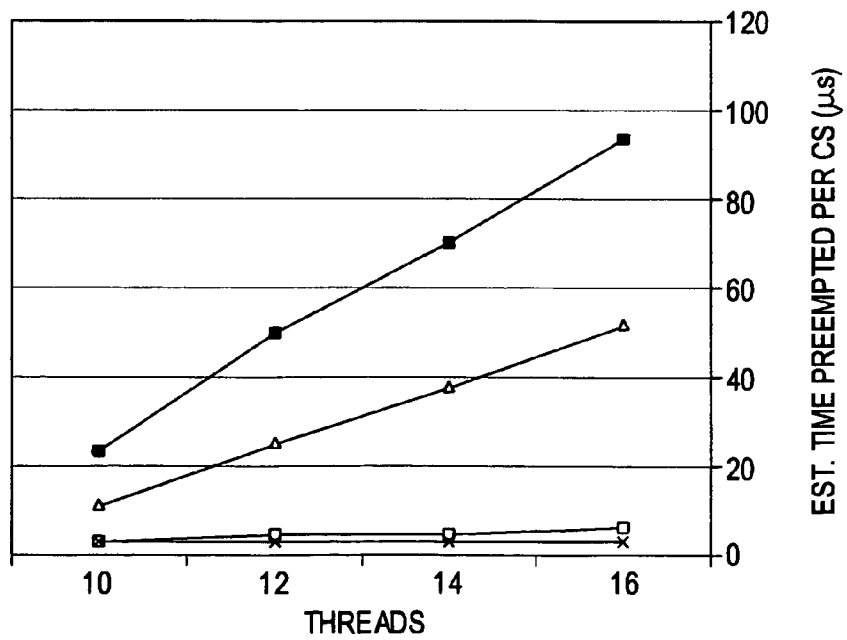
FIG. 7B shows estimated overhead of timeout.

FIGS. 7A and 7B plot the estimates of $T_x$ and $T_h$, respectively, for the experiments depicted in FIGS. 6A and 6B, with t>8 threads. Values for $T_x$ vary greatly from run to run, reflecting the fact that preemption in a critical section is relatively rare, but very expensive. Variations among algorithms in preempted time per critical section can be attributed to the rate of success of acquire operations and, to a lesser extent, lock overhead. Higher rates of success and lower overhead increase the percentage of time that a thread is in its critical section, and thus the likelihood that it will be preempted there. FIG. 7B shows that with the CLH-NB and MCS-NB try locks, a thread can leave the queue within a modest constant amount of time. In the CLH try and MCS try locks it can be arbitrarily delayed by the preemption of a neighboring thread.

The times given in FIG. 7B are significantly larger than the "times" given in FIG. 6B. By dividing wall clock time ($T_s$) by the total number of acquire attempts (ti), FIG. 6B effectively pretends that all those operations happen sequentially. The calculations behind FIG. 7B recognize that much of the work occurs in parallel.

As part of the experiments reported in the previous section, space management routines were instrumented to remember the maximum number of queue nodes ever extant at one time. Across the sixteen measured runs, encompassing six million acquire/release pairs, the maximum number of allocated queue nodes was 84, or roughly 5 per thread. The CLH-NB and MCS-NB try locks appear to be roughly comparable in the number of nodes they require.

Given that the experiment was deliberately designed to induce an unreasonably high level of lock contention, and to maximize the chance of inopportune preemption, the relatively modest maximum number of queue nodes is reassuring: space overhead would not appear to be an obstacle to the use of non-blocking timeout in any realistic setting.

Taken together, the two sets of experiments confirm that it is possible, given standard atomic operations, to construct queue-based locks in which a thread can time out and abandon its attempt to acquire the lock. For each of the two preferred embodiments of the present invention, the variant with blocking timeout guarantees immediate reclamation of abandoned queue nodes, but requires that a departing thread obtain the cooperation of its neighbors. The variants with non-blocking timeout can safely be used in the presence of preemption (assuming, of course, that the processor can be put to other use while waiting for the preempted lock holder to be rescheduled).

The price of non-blocking timeout is an unbounded worst-case requirement for space. Large amounts of space appear unlikely to be required in practice, however, and experimental results confirm this expectation.

Results obtained on a 64-processor Sun Enterprise 10000 indicate that traditional test-and-test _and_set (TATAS) locks, which support timeout trivially, do not scale to large machines, even when designed to back off in the presence of contention. Technological trends would appear to be making queue-based locks increasingly important, and a timeout mechanism significantly increases the scope of their applicability. On a single processor, without contention, the CLH-NB try lock takes about twice as long as the original (no timeout) CLH lock, which in turn takes about twice as long as a conventional TATAS lock (with or without timeout). The significance of this single-processor overhead is unclear: unless threads all access different locks, a lock that sees little contention is probably lightly used, and its overhead is unlikely to have a significant impact on overall program run time.

With 64 processors attempting to acquire the lock simultaneously, however, experiments reveal cases in which attempts to acquire a TATAS lock (with backoff) took more than six times as long as attempts to acquire a CLH-NB try lock, while failing (timing out) more than 22 times as often (82% of the time, v. 3.7% for the CLH-NB try lock). While one of course attempts in any parallel program to avoid high lock contention, pathological cases do indeed arise in practice, particularly in transaction processing systems, and graceful performance degradation in these cases is of significant concern to customers.

For small-scale multiprocessors, TATAS with backoff continues to be the preferred lock algorithm. Queue-based locks, however, are attractive for larger machines, or for cases in which fairness and regularity of timing are particularly important. The CLH lock, both with and without timeout, has better overall performance than the MCS lock on cache-coherent machines. The CLH-NB try lock is also substantially simpler than the MCS-NB try lock. The relative performance of the queue-based locks would be expected to reverse, however, on a non-cache-coherent machine, even if the CLH-NB try lock were modified to ensure local-only spinning, using an extra level of indirection in the manner suggested by Craig for the original CLH lock.

The present inventor has presented papers disclosing the present invention: "Scalable Queue-Based Spin Locks with Timeout," at the $8^{th}$ ACM Conference on Principles and Practice of Parallel Programming, Jun. 18, 2001, Snowbird, Utah; and "Non-Blocking Timeout in Scalable Queue-based Spin Locks," at the $21^{st}$ ACM Annual Symposium on Principles of Distributed Computing, Monterey, Calif., Jul. 22, 2002. The disclosures of both of those papers are hereby incorporated by reference in their entireties into the present disclosure.

While two preferred embodiments, with variants, have been set forth in detail, those skilled in the art who have reviewed the present disclosure will readily appreciate that other embodiments can be realized within the scope of the invention. For example, the present invention is not limited to any particular hardware, nor is it limited to any particular operating system or programming language. Similarly, on a non-cache-coherent machine, the CLH try and CLH-NB try locks could easily be modified to spin only on local variables, using an extra level of indirection. Therefore, the present invention should be construed as limited only by the appended claims.

I claim:

1. A method of implementing a queue-based spin lock with timeout in a computing device running a plurality of threads, the method comprising:
   (a) providing a queue as a linked list of nodes, the nodes in the linked list representing threads waiting for the lock, the list being accessed through a tail pointer,
   (b) permitting a thread to acquire the lock when the thread reaches the head of the queue; and
   (c) when a thread times out and abandons its attempt to acquire the lock, removing the node corresponding to the timed-out thread from the linked list, so that the nodes of the predecessor and the successor of the timed-out thread out become neighbors in the queue.

2. The method of claim 1, wherein each of the plurality of threads spins on its predecessor's node.

3. The method of claim 2, wherein a thread that times out reclaims its own node, handshaking with neighbors in the queue to resolve any race conditions.

4. The method of claim 3, wherein the thread that times out performs the following:
   (a) waits until its predecessor's node is not marked;
   (b) marks its predecessor's node to prevent the predecessor from timing out concurrently;
   (c) waits until its own node is not marked, then marks its own node;
   (d) attempts to swing the tail pointer from its own node to its predecessor's node;
   (e) if step (d) is unsuccessful, waits until its successor marks the node of the timed-out thread to indicate that the successor has updated the successor's predecessor pointer; and
   (f) reclaims its node and returns.

5. The method of claim 2, wherein a thread that times out marks its node as abandoned, and the successor reclaims that node, allowing the timed-out thread to complete its operation within a bounded number of its own time steps.

6. The method of claim 1, wherein each thread spins on its own queue node.

7. The method of claim 6, wherein a thread that times out reclaims its own queue node, handshaking with neighbors in the queue to resolve any race conditions, and giving priority for forward progress, where possible, to the thread closer to the head of the queue.

8. The method of claim 7, wherein the thread that times out performs the following:
   (a) replaces the pointer from its node to the node of its successor, if any, with a special marker;
   (b) replaces the pointer to its node from the node of its successor, if any, with a special marker;
   (c) replaces the pointer from its node to the node of its predecessor with a special marker;
   (d) replaces the pointer to its node from the node of its predecessor with a special marker;
   (e) replaces (i) the marker in the successor's queue node, if there is a successor, or (ii) the tail pointer of the list, if there is not a successor, with a pointer to the predecessor's queue node;
   (f) if the successor exists, waits for the successor to replace the marker in the predecessor's queue node with a pointer to the successor's queue node;
   (g) if the successor does not exist, replaces the marker in the predecessor's queue node with a nil pointer; and
   (h) reclaims its node and returns.

9. The method of claim 6, wherein the thread that times out marks its queue node as abandoned, and the successor or predecessor reclaims that node, allowing the timed-out thread to complete its operation within a bounded number of its own time steps.

10. The method of claim 9, wherein the thread that times out performs the following:
   (a) replaces with nil the pointer to its queue node found in its predecessor's queue node;
   (b) marks its own queue node;
   (c) marks the queue node of its successor, if any; and
   (d) returns;
   the successor updates the successor pointer in the queue node of the predecessor of the timed-out thread, and then reclaims the queue node of the timed-out thread; and
   if the timed-out thread is unable to replace the successor pointer in its predecessor's queue node due to a race condition,
   (e) the timed-out thread informs its successor, if any, of the continued existence of the predecessor's pointer;
   (f) the successor uses a swap operation to mark the node of the timed-out thread when the successor has removed the node of the timed-out thread from the queue;
   (g) the predecessor uses swap operations whenever it needs to mark the node of the timed-out thread; and
   (h) both predecessor and successor threads reclaim the node of the timed-out thread if the result of the swap operation in (f) or (g) indicates that the other thread (successor or predecessor, respectively) has already completed its operation, and will not access the node again.

11. A method of implementing a queue-based spin lock with timeout in a computing device running a plurality of threads, the method comprising:
   (a) providing a queue as a linked list of nodes, the nodes in the linked list representing threads waiting for the lock, the list being accessed through a tail pointer;
   (b) permitting a thread to acquire the lock when the thread reaches the head of the queue;
   (c) causing each thread to spin on a queue node allocated by its predecessor; and
   (d) indicating an unheld lock by a queue containing only one node, marked available, or by a queue containing zero nodes
   (e) causing a thread that releases the lock (by marking its queue node available), or that times out and marks its queue node abandoned, to perform a compare-and-swap operation on the queue tail pointer in an attempt to remove its node from the queue.

12. An article of manufacture for implementing a queue-based spin lock with timeout in a computing device running a plurality of threads, the article of manufacture comprising:
   a storage medium readable by the computing device; and
   code, stored on the storage medium, for controlling the computing device to perform the following operational steps:
   (a) providing a queue as a linked list of nodes, the nodes in the linked list representing threads waiting for the lock, the list being accessed through a tail pointer,
   (b) permitting a thread to acquire the lock when the thread reaches the head of the queue; and
   (c) when a thread times out and abandons its attempt to acquire the lock, removing the node corresponding to the timed-out thread from the linked list, so that the nodes of the predecessor and the successor of the timed-out thread become neighbors in the queue.

13. The article of manufacture of claim 12, wherein each of the plurality of threads spins on its predecessor's node.

14. The article of manufacture of claim 13, wherein a thread that times out reclaims its own node, handshaking with neighbors in the queue to resolve any race conditions.

15. The article of manufacture of claim 14, wherein the thread that times out performs the following:
   (a) waits until its predecessor's node is not marked;
   (b) marks its predecessor's node to prevent the predecessor from timing out concurrently;
   (c) waits until its own node is not marked, then marks its own node;
   (d) attempts to swing the tail pointer from its own node to its predecessor's node;
   (e) if step (d) is unsuccessful, waits until its successor marks the node of the timed-out thread to indicate that the successor has updated the successor's predecessor pointer; and (f) reclaims its node and returns.

16. The article of manufacture of claim 13, wherein a thread that times out marks its node as abandoned, and the successor reclaims that node, allowing the timed-out thread to complete its operation within a bounded number of its own time steps.

17. The article of manufacture of claim 12, wherein each thread spins on its own queue node.

18. The article of manufacture of claim 17, wherein a thread that times out reclaims its own queue node, handshaking with neighbors in the queue to resolve any race conditions, and giving priority for forward progress, where possible, to the thread closer to the head of the queue.

19. The article of manufacture of claim 18, wherein the thread that times out performs the following:

(a) replaces the pointer from its node to the node of its successor, if any, with a special marker;

(b) replaces the pointer to its node from the node of its successor, if any, with a special marker;

(c) replaces the pointer from its node to the node of its predecessor with a special marker;

(d) replaces the pointer to its node from the node of its predecessor with a special marker;

(e) replaces (i) the marker in the successor's queue node, if there is a successor, or (ii) the tail pointer of the list, if there is not a successor, with a pointer to the predecessor's queue node;

(f) if the successor exists, waits for the successor to replace the marker in the predecessor's queue node with a pointer to the successor's queue node;

(g) if the successor does not exist, replaces the marker in the predecessor's queue node with a nil pointer; and (h) reclaims its node and returns.

20. The article of manufacture of claim 17, wherein the thread that times out marks its queue node as abandoned, and the successor or predecessor reclaims that node, allowing the timed-out thread to complete its operation within a bounded number of its own time steps.

21. The article of manufacture of claim 20, wherein the thread that times out performs the following:

(a) replaces with nil the pointer to its queue node found in its predecessor's queue node;

(b) marks its own queue node;

(c) marks the queue node of its successor, if any; and (d) returns;

the successor updates the successor pointer in the queue node of the predecessor of the timed-out thread, and then reclaims the queue node of the timed-out thread; and if the timed-out thread is unable to replace the successor pointer in its predecessor's queue node due to a race condition, (e) the timed-out thread informs its successor, if any, of the continued existence of the predecessor's pointer;

(f) the successor uses a swap operation to mark the node of the timed-out thread when the successor has removed the node of the timed-out thread from the queue;

(g) the predecessor uses swap operations whenever it needs to mark the node of the timed-out thread; and (h) both predecessor and successor threads reclaim the node of the timed-out thread if the result of the swap operation in (f) or (g) indicates that the other thread (successor or predecessor, respectively) has already completed its operation, and will not access the node again.

22. An article of manufacture for implementing a queue-based spin lock with timeout in a computing device running a plurality of threads, the article of manufacture comprising:

a storage medium readable by the computing device; and code, stored on the storage device, for controlling the computing device to perform the following operational steps:

(a) providing a queue as a linked list of nodes, the nodes in the linked list representing threads waiting for the lock, the list being accessed through a tail pointer;

(b) permitting a thread to acquire the lock when the thread reaches the head of the queue;

(c) causing each thread to spin on a queue node allocated by its predecessor; and (d) indicating an unheld lock by a queue containing only one node, marked available, or by a queue containing zero nodes (e) causing a thread that releases the lock (by marking its queue node available), or that times out and marks its queue node abandoned, to perform a compare-and-swap operation on the queue tail pointer in an attempt to remove its node from the queue.

23. A computing device for implementing a queue-based spin lock with timeout while running a plurality of threads, the computing device comprising:

a memory; and a plurality of processors, in communication with the memory, for running the plurality of threads and for performing the following operational steps:

(a) providing a queue as a linked list of nodes, the nodes in the linked list representing threads waiting for the lock, the list being accessed through a tail pointer, (b) permitting a thread to acquire the lock when the thread reaches the head of the queue; and (c) when a thread times out and abandons its attempt to acquire the lock, removing the node corresponding to the timed-out thread from the linked list, so that the nodes of the predecessor and the successor of the timed-out thread out become neighbors in the queue.

24. The computing device of claim 23, wherein each of the plurality of threads spins on its predecessor's node.

25. The computing device of claim 24, wherein a thread that times out reclaims its own node, handshaking with neighbors in the queue to resolve any race conditions.

26. The computing device of claim 25, wherein the thread that times out performs the following:

(a) waits until its predecessor's node is not marked;

(b) marks its predecessor's node to prevent the predecessor from timing out concurrently;

(c) waits until its own node is not marked, then marks its own node;

(d) attempts to swing the tail pointer from its own node to its predecessor's node;

(e) if step (d) is unsuccessful, waits until its successor marks the node of the timed-out thread to indicate that the successor has updated the successor's predecessor pointer; and (f) reclaims its node and returns.

27. The computing device of claim 24, wherein a thread that times out marks its node as abandoned, and the successor reclaims that node, allowing the timed-out thread to complete its operation within a bounded number of its own time steps.

28. The computing device of claim 23, wherein each thread spins on its own queue node.

29. The computing device of claim 28, wherein a thread that times out reclaims its own queue node, handshaking with neighbors in the queue to resolve any race conditions, and giving priority for forward progress, where possible, to the thread closer to the head of the queue.

30. The computing device of claim 29, wherein the thread that times out performs the following:
  (a) replaces the pointer from its node to the node of its successor, if any, with a special marker;
  (b) replaces the pointer to its node from the node of its successor, if any, with a special marker;
  (c) replaces the pointer from its node to the node of its predecessor with a special marker;
  (d) replaces the pointer to its node from the node of its predecessor with a special marker;
  (e) replaces (i) the marker in the successor's queue node, if there is a successor, or (ii) the tail pointer of the list, if there is not a successor, with a pointer to the predecessor's queue node;
  (f) if the successor exists, waits for the successor to replace the marker in the predecessor's queue node with a pointer to the successor's queue node;
  (g) if the successor does not exist, replaces the marker in the predecessor's queue node with a nil pointer; and
  (h) reclaims its node and returns.

31. The computing device of claim 28, wherein the thread that times out marks its queue node as abandoned, and the successor or predecessor reclaims that node, allowing the timed-out thread to complete its operation within a bounded number of its own time steps.

32. The computing device of claim 31, wherein the thread that times out performs the following:
  (a) replaces with nil the pointer to its queue node found in its predecessor's queue node;
  (b) marks its own queue node;
  (c) marks the queue node of its successor, if any; and
  (d) returns;
  the successor updates the successor pointer in the queue node of the predecessor of the timed-out thread, and then reclaims the queue node of the timed-out thread; and
  if the timed-out thread is unable to replace the successor pointer in its predecessor's queue node due to a race condition,
  (e) the timed-out thread informs its successor, if any, of the continued existence of the predecessor's pointer;
  (f) the successor uses a swap operation to mark the node of the timed-out thread when the successor has removed the node of the timed-out thread from the queue;
  (g) the predecessor uses swap operations whenever it needs to mark the node of the timed-out thread; and
  (h) both predecessor and successor threads reclaim the node of the timed-out thread if the result of the swap operation in (f) or (g) indicates that the other thread (successor or predecessor, respectively) has already completed its operation, and will not access the node again.

33. A computing device for implementing a queue-based spin lock with timeout while running a plurality of threads, the computing device comprising:
  a memory; and
  a plurality of processors, in communication with the memory, for running the plurality of threads and for performing the following operational steps:
  (a) providing a queue as a linked list of nodes, the nodes in the linked list representing threads waiting for the lock, the list being accessed through a tail pointer;
  (b) permitting a thread to acquire the lock when the thread reaches the head of the queue;
  (c) causing each thread to spin on a queue node allocated by its predecessor; and
  (d) indicating an unheld lock by a queue containing only one node, marked available, or by a queue containing zero nodes
  (e) causing a thread that releases the lock (by marking its queue node available), or that times out and marks its queue node abandoned, to perform a compare-and-swap operation on the queue tail pointer in an attempt to remove its node from the queue.

* * * * *